(12) United States Patent
Anwer et al.

(10) Patent No.: US 11,146,618 B2
(45) Date of Patent: *Oct. 12, 2021

(54) APPLICATION INTERACTION PLATFORM

(71) Applicant: Microsoft Technology Licensing, LLC, Redmond, WA (US)

(72) Inventors: Muhammad Usman Anwer, Seattle, WA (US); Kunal Ramesh Gandhi, Redmond, WA (US); Jill Cary Bender, Seattle, WA (US); Abolade Gbadegesin, Sammamish, WA (US); Jonathan D. Wiswall, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 209 days.

This patent is subject to a terminal disclaimer.

(21) Appl. No.: 15/425,942

(22) Filed: Feb. 6, 2017

(65) Prior Publication Data
US 2017/0374156 A1 Dec. 28, 2017

Related U.S. Application Data

(60) Provisional application No. 62/355,601, filed on Jun. 28, 2016.

(51) Int. Cl.
*G06F 15/16* (2006.01)
*H04L 29/08* (2006.01)
(Continued)

(52) U.S. Cl.
CPC .............. *H04L 67/10* (2013.01); *G06F 9/445* (2013.01); *G06F 9/541* (2013.01); *G06F 21/31* (2013.01);
(Continued)

(58) Field of Classification Search
None
See application file for complete search history.

(56) References Cited

U.S. PATENT DOCUMENTS 6,430,567 B2  8/2002  Burridge
6,463,078 B1  10/2002  Engstrom et al.
(Continued)

FOREIGN PATENT DOCUMENTS

WO  2001097022 A2  12/2001

OTHER PUBLICATIONS

"International Search Report and Written Opinion", Application No. PCT/US2017/037094, dated Dec. 22, 2017, 12 pages.
(Continued)

*Primary Examiner* — Brian Whipple
*Assistant Examiner* — Gregory P Tolchinsky
(74) *Attorney, Agent, or Firm* — Fiala & Weaver P.L.L.C.

(57) ABSTRACT

Techniques for an application interaction platform are described. In at least some implementations, an instance of a first application can initiate a launch of an instance of a second application. In a scenario where the second application is a multiuser application, the second application can be launched as either a multiuser instance or a single user instance depending on a launch context. Implementations also enable communication among applications, such as to enable applications to exchange state information and modify their execution based on the information.

20 Claims, 14 Drawing Sheets

(51) Int. Cl.
*G06F 9/445* (2018.01)
*G06F 9/54* (2006.01)
*G06F 21/31* (2013.01)
*H04L 29/06* (2006.01)

(52) U.S. Cl.
CPC .......... *H04L 65/403* (2013.01); *H04L 67/025* (2013.01); *H04L 67/141* (2013.01); *H04L 67/303* (2013.01); *H04L 67/306* (2013.01)

(56) References Cited

U.S. PATENT DOCUMENTS

| | | | |
|---|---|---|---|
| 6,850,953 B1* | 2/2005 | Deshpande | G06F 16/289 |
| 7,770,134 B2 | 8/2010 | Evans et al. | |
| 7,895,645 B2 | 2/2011 | Bodepudi et al. | |
| 8,556,713 B2 | 10/2013 | Pilip | |
| 9,201,709 B2 | 12/2015 | Momchilov et al. | |
| 9,985,999 B1* | 5/2018 | Simon | H04L 65/403 |
| 2004/0192440 A1 | 9/2004 | Evans et al. | |
| 2008/0244219 A1 | 10/2008 | Kobayashi | |
| 2009/0187834 A1 | 7/2009 | Rapo et al. | |
| 2011/0145341 A1 | 6/2011 | Hampel | |
| 2013/0067473 A1 | 3/2013 | Olson | |
| 2014/0073289 A1* | 3/2014 | Velasco | H04W 12/04 455/411 |
| 2015/0106691 A1* | 4/2015 | Arzuffi | G06F 17/2247 715/234 |
| 2016/0277508 A1* | 9/2016 | Byskal | H04L 67/142 |
| 2016/0332081 A1* | 11/2016 | Marr | A63F 13/63 |
| 2017/0033989 A1* | 2/2017 | Toprani | H04L 41/0846 |
| 2017/0374138 A1 | 12/2017 | Anwer et al. | |
| 2017/0374156 A1 | 12/2017 | Anwer et al. | |
| 2019/0258430 A1 | 8/2019 | Chang et al. | |

OTHER PUBLICATIONS

Rakesh, "Using Attribute-Based Access Control to Enable Attribute-Based Messaging", Computer Security Applications Conference, 2006, Dec. 1, 2006, 11 pages.

Wong, et al., "Operating System Support for Multi-User, Remote, Graphical Interaction", In Proceedings of the USENIX Annual Technical Conference, Jun. 18, 2000, 13 pages.

"Interix in a Multi-User Windows TSE Environment", Published on: Jun. 23, 2007 Available at: https://technet.microsoft.com/en-us/library/bb463198.aspx.

"Building Multiuser-Aware Apps", Published on: Jun. 23, 2015 Available at: https://source.android.com/devices/tech/admin/multiuser-apps.html#enabling_a_singleton_component.

Koren, et al., "Introduction to multi-user applications", Retrieved on: Jun. 9, 2016 Available at: https://msdn.microsoft.com/en-us/windows/uwp/xbox-apps/multi-user-applications.

"International Search Report and Written Opinion", Application No. PCT/US2017/038636, dated Sep. 14, 2017, 11 pages.

"Non Final Office Action Issued in U.S. Appl. No. 15/390,282", dated Mar. 20, 2019, 10 Pages.

"Final Office Action Issued in U.S. Appl. No. 15/390,282", dated Oct. 1, 2019, 11 Pages.

* cited by examiner

APPLICATION INTERACTION PLATFORM

RELATED APPLICATIONS

This application claims priority under 35 U.S.C. Section 119(e) to U.S. Provisional Patent Application No. 62/355,601, filed Jun. 28, 2016 and titled "Multiuser Aware Applications," the entire disclosure of which is hereby incorporated by reference.

BACKGROUND

Traditional operating systems (OS) rely on separate interactive sessions for each user. They may allow multiple users to switch in and out of an operating system and application experiences, but user interactions and integration with services and features is typically limited to one user at a time.

Enabling parallel application functionality on a traditional operating system typically requires an application developer to conceive their own user model that is managed in the application layer. This fundamentally limits the user-related customization that can be achieved since there is no support for multiple users in a same application session.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for an application interaction platform are described. In at least some implementations, an instance of a first application can initiate a launch of an instance of a second application. In a scenario where the second application is a multiuser application, the second application can be launched as either a multiuser instance or a single user instance depending on a launch context. Implementations also enable communication among applications, such as to enable applications to exchange state information and modify their execution based on the information.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Identical numerals followed by different letters in a reference number may refer to difference instances of a particular item.

DETAILED DESCRIPTION

Figure 1:
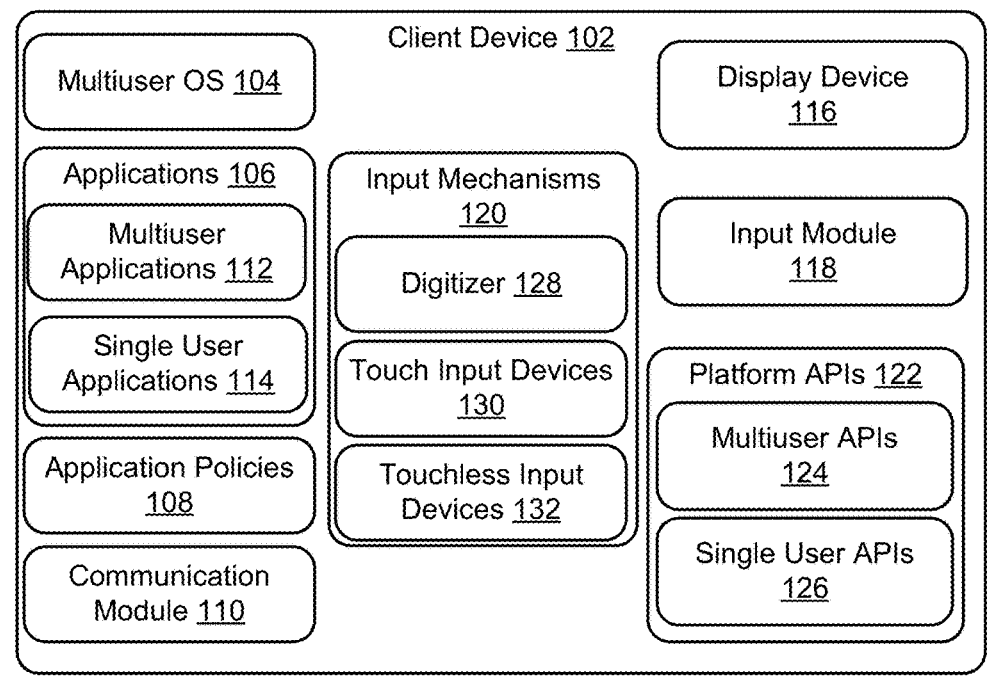
FIG. 1 is an illustration of an environment in an example implementation that is operable to employ techniques discussed herein.
Figure 1:
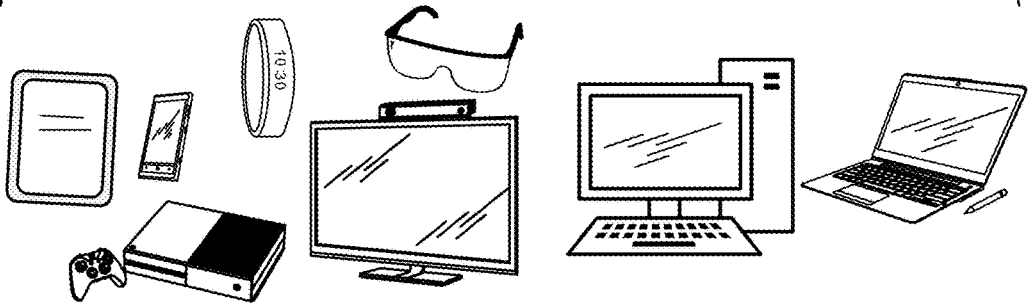

Implementations discussed herein provide an application interaction platform. The platform, for instance, includes a multiuser operating system (OS) infrastructure and application model that allows multiple users to consume applications and OS services sequentially and/or simultaneously. For example, multiple users can be authenticated (e.g., logged in) to a multiuser OS at the same time, allowing the OS shell to activate multiuser aware applications. As new users authenticate and deauthenticate, the multiuser OS can send information about the new active users to a multiuser application. The multiuser application can then tailor an app experience to the active user based on user-scoped preferences, settings, and data handled by the multiuser OS and modified by the app via user aware platform affordances, such as multiuser application programming interfaces (APIs). Techniques described herein also enable simultaneous combined in-app collaboration. For instance, multiple users can work on a document within a multiuser application together at the same time using user-context queues from the system for the app to know which user is performing which action.

The tight OS-app integration described herein allows for rapid switching of an app experience between different users, without requiring a multiuser application to close and launch again with content customized to a new user. Thus, a programming model is enabled that facilities porting a single user application to a multiuser application without significant changes to an application codebase. Further, a multiuser application can execute as a single user application dependent on an application launch context, such as on a traditional OS that only supports single user applications.

Implementations discussed herein also enable application-to-application ("app-app") interaction, such as for app-app launching and communication. For example, an instance of a first application can initiate a launch of an instance of a second application. In at least some implementations, the second application is a multiuser application, and based on a launch context, the multiuser application can be launched as either a multiuser instance or a single user instance of the multiuser application. Further, different instances of applications can communicate with one another, such as to exchange state and content information. An instance of a first application, for example, can communicate with an instance of a second application to enable the instance of the second application to modify its execution context.

Accordingly, techniques described herein reduce computing resources required to create and execute multiuser applications by providing native multiuser functionality implemented at the OS level. For instance, memory and data storage resource usage is reduced by not requiring an application to include functionality to manage multiuser authentication, input attribution, and app-app interaction.

Having presented an overview of techniques for an application interaction platform, consider now an example environment in which techniques described herein may be implemented.

FIG. 1 is an illustration of an environment 100 in an example implementation that is operable to employ techniques for multiuser aware applications discussed herein. Environment 100 includes a client device 102 which can be embodied as any suitable device such as, by way of example and not limitation, a smartphone, a tablet computer, a portable computer (e.g., a laptop), a desktop computer, a wearable device, and so forth. In at least some implementations, the client device 102 represents a smart appliance, such as an Internet of Things ("IoT") device. Thus, the client device 102 may range from a system with significant processing power, to a lightweight device with minimal processing power. One of a variety of different examples of a client device 102 is shown and described below in FIG. 14.

The client device 102 includes a variety of different functionalities that enable various activities and tasks to be performed. For instance, the client device 102 includes a multiuser operating system ("OS") 104, applications 106, application policies 108, and a communication module 110. Generally, the multiuser OS 104 is representative of functionality for abstracting various system components of the client device 102, such as hardware, kernel-level modules and services, and so forth. The multiuser OS 104, for instance, can abstract various components (e.g., hardware, software, and firmware) of the client device 102 to the applications 106 to enable interaction between the components and the applications 106. As further described below, the multiuser OS 104 also implements various aspects of techniques for the application interaction platform described herein.

The applications 106 represent functionalities for performing different tasks via the client device 102. Examples of the applications 106 include a word processing application, a spreadsheet application, a web browser, a gaming application, and so forth. The applications 106 may be installed locally on the client device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The applications 106 include multiuser applications 112 and single user applications 114. The multiuser applications 112 represent applications that that are configured to allow multiple users to consume the applications and OS services sequentially and/or simultaneously. Different attributes of the multiuser applications 112 are detailed throughout this disclosure. The single user applications 114 are representative of applications that are configured to run based on a single user identity. For instance, the single user applications 114 are not configured to enable multiple user identities to be logged in and/or active within a single instance of a single user application 114.

As further detailed below, the multiuser OS 104 is configured to manage launching and execution of the multiuser applications 112 and the single user applications 114 and based on a variety of different contextual factors. For instance, the application policies 108 indicate different behaviors that can be applied to different execution scenarios for the applications 106. The application policies 108, for instance, specify allowed and disallowed behaviors that apply based on whether a particular application 106 is a multiuser application 112 or a single user application 114. Further, the application policies 108 can enforce behaviors for the applications 106 based a particular device type and/or execution platform on which the applications 106 are launched.

The communication module 110 is representative of functionality for enabling the client device 102 to communication over wired and/or wireless connections. For instance, the communication module 110 represents hardware and logic for communication via a variety of different wired and/or wireless technologies and protocols.

The client device 102 further includes a display device 116, an input module 118, and input mechanisms 120. The display device 116 generally represents functionality for visual output for the client device 102. Additionally, the display device 116 represents functionality for receiving various types of input, such as touch input, pen input, and so forth. The input module 118 is representative of functionality to enable the client device 102 to receive input (e.g., via the input mechanisms 120) and to process and route the input in various ways.

The client device 102 further includes platform application programming interfaces (APIs) 122, which include multiuser APIs 124 and single user APIs 126. Generally, the platform APIs 122 enable various aspects of techniques for application interaction platform discussed herein. The multiuser APIs 124, for instance, enable an OS shell of the multiuser OS 104 to send information about a new active user to a multiuser application 112, which can then tailor an app experience to this user based on user scoped preferences, settings, and data handled by the multiuser OS 104 and modified by the multiuser application 112. The single user APIs 126 enable single user applications 114 to launch and execute via the multiuser OS 104, while enforcing single user application behaviors. Thus, app developers can integrate their applications into a multiuser aware environment using the platform APIs 122 with minimal cognitive load.

The input mechanisms 120 generally represent different functionalities for receiving input to the client device 102, and include a digitizer 128, touch input devices 130, and touchless input devices 132. Examples of the input mechanisms 120 include gesture-sensitive sensors and devices (e.g., such as touch-based sensors and movement-tracking sensors (e.g., camera-based)), a mouse, a keyboard, a stylus, a touch pad, accelerometers, a microphone with accompanying voice recognition software, and so forth. The input mechanisms 120 may be separate or integral with the display device 116; integral examples include gesture-sensitive displays with integrated touch-sensitive or motion-sensitive sensors. The digitizer 128 represents functionality for converting various types of input to the display device 116 and the touch input devices 130 into digital data that can be used by the client device 102 in various ways, such as for generating digital ink, responding to touch input, and so forth.

The touchless input devices 132 generally represent different devices for recognizing different types of non-contact input, and are configured to receive a variety of touchless input, such as via visual recognition of human gestures, object scanning, voice recognition, color recognition, and so on. In at least some embodiments, the touchless input devices 132 are configured to recognize gestures, poses, body movements, objects, images, and so on, via cameras. An example camera, for instance, can be configured with lenses, light sources, and/or light sensors such that a variety of different phenomena can be observed and captured as input. For example, the camera can be configured to sense movement in a variety of dimensions, such as vertical movement, horizontal movement, and forward and backward movement, e.g., relative to the touchless input devices 132. Thus, in at least some embodiments, the touchless input devices 132 can capture information about image composition, movement, and/or position.

Having described an example environment in which the techniques described herein may operate, consider now a discussion of some example implementation scenarios in accordance with one or more embodiments. The implementation scenarios may be implemented in the environment 100 discussed above, and/or any other suitable environment.

Figure 2:
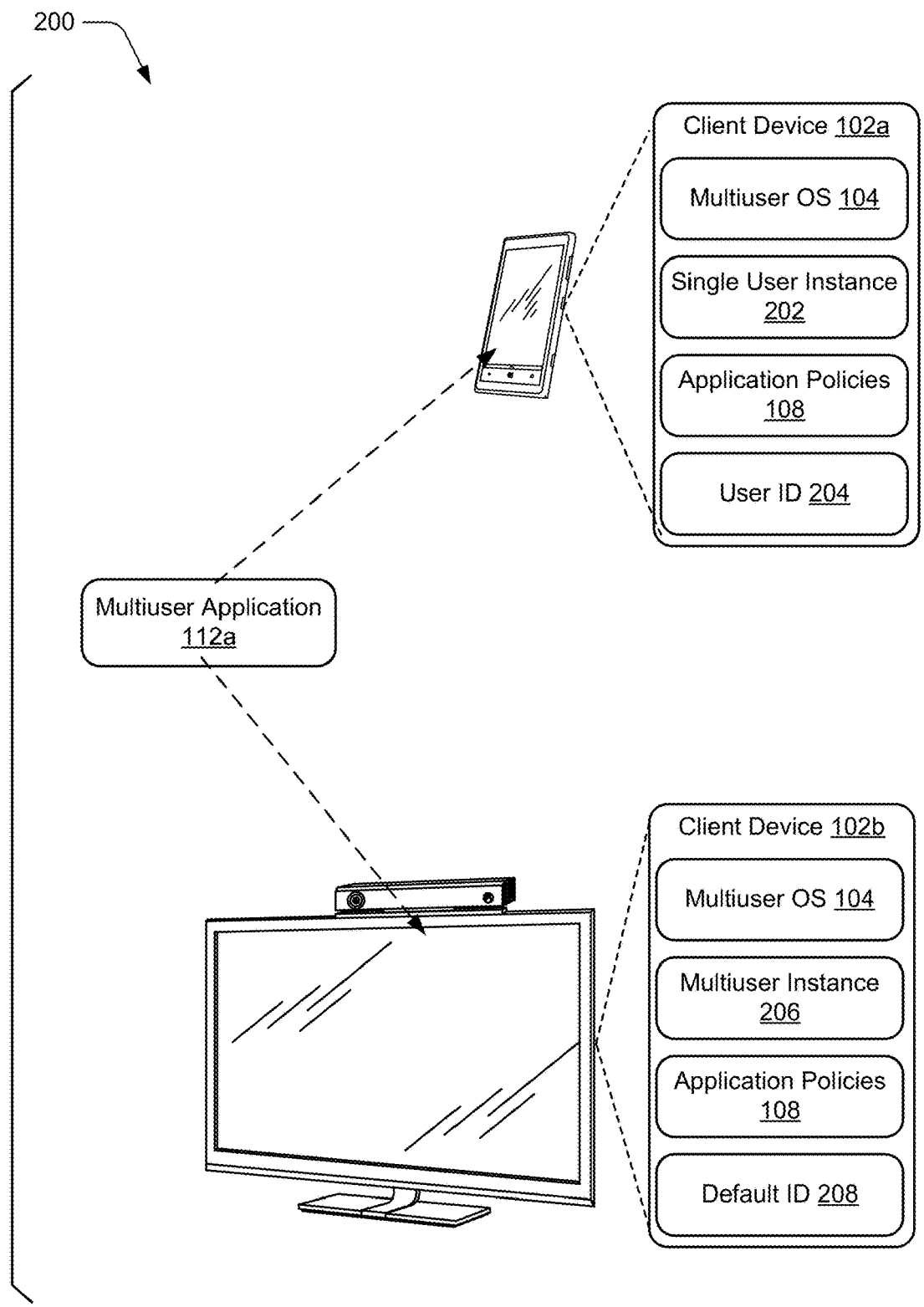
FIG. 2 depicts an example implementation scenario for launching a multiuser application in accordance with one or more embodiments.

FIG. 2 depicts an example implementation scenario 200 for launching a multiuser application in accordance with one or more implementations. The scenario 200 includes a client device 102a and a client device 102b, which represent different instances of the client device 102 described above. According to techniques for application interaction platform described herein, the client device 102a launches (e.g., starts and executes) a multiuser application 112a as a single user instance 202. Generally, the single user instance 202 represents an execution of the multiuser application 112a as a single user application instance. The single user instance 202, for example, is launched based on a user identity (ID) 204 associated with the client device 102a.

According to one or more implementations, the multiuser OS 104 causes the multiuser application 112a to launch on the client device 102a as the single user instance 202 based on the application policies 108. The application policies 108, for example, are evaluated based on attributes of the client device 102a to determine that the multiuser application 112a is to launch as the single user instance 202 on the client device 102a. Different attributes that can be considered by the application policies 108 include device type (e.g., device form factor), device resources (e.g., processor bandwidth, memory resources, and so forth), typical device usage scenarios (e.g., single user device, multiuser device, and so on), device settings (e.g., default to single user or multiuser launch), user preferences, and so forth.

Accordingly, the single user instance 202 executes on the client device 102a, and a user can interact with the single user instance 202 as a single user application and based on the user ID 204. For instance, the single user instance 202 is tailored to various content and permissions of the user ID 204.

Further to the scenario 200, the multiuser application 112a launches on the client device 102b as a multiuser instance 206. Generally, the multiuser instance 206 represents execution of the multiuser application 112a as a multiuser aware application. The multiuser instance 206, for example, launches and executes using a default ID 208. In at least some implementations, the default ID 208 is not associated with a particular individual user profile, but represents a default system ID that is used (e.g., by the client device 102b) to execute multiuser applications.

According to one or more implementations, the multiuser OS 104 causes the multiuser application 112a to launch as the multiuser instance 206 based on the application policies 108. The application policies 108, for example, are evaluated based on attributes of the client device 102b to determine that the multiuser application 112a is to launch as the multiuser instance 206 on the client device 102b.

Accordingly, the application policies 108 can specify based on different criteria (e.g., device and/or user attributes) whether the multiuser application 112a is to launch as a multiuser application instance or a single user application instance. Further, the versions of the multiuser application 112a executed by the client device 102a and the client device 102b can include identical code that is executed differently on the different devices, such as based on differing attributes of the devices 102a, 102b and the application policies 108.

Generally, different users can interact with the multiuser instance 206 while the multiuser instance 206 is running. Consider, for example, the following implementation scenarios.

Figure 3:
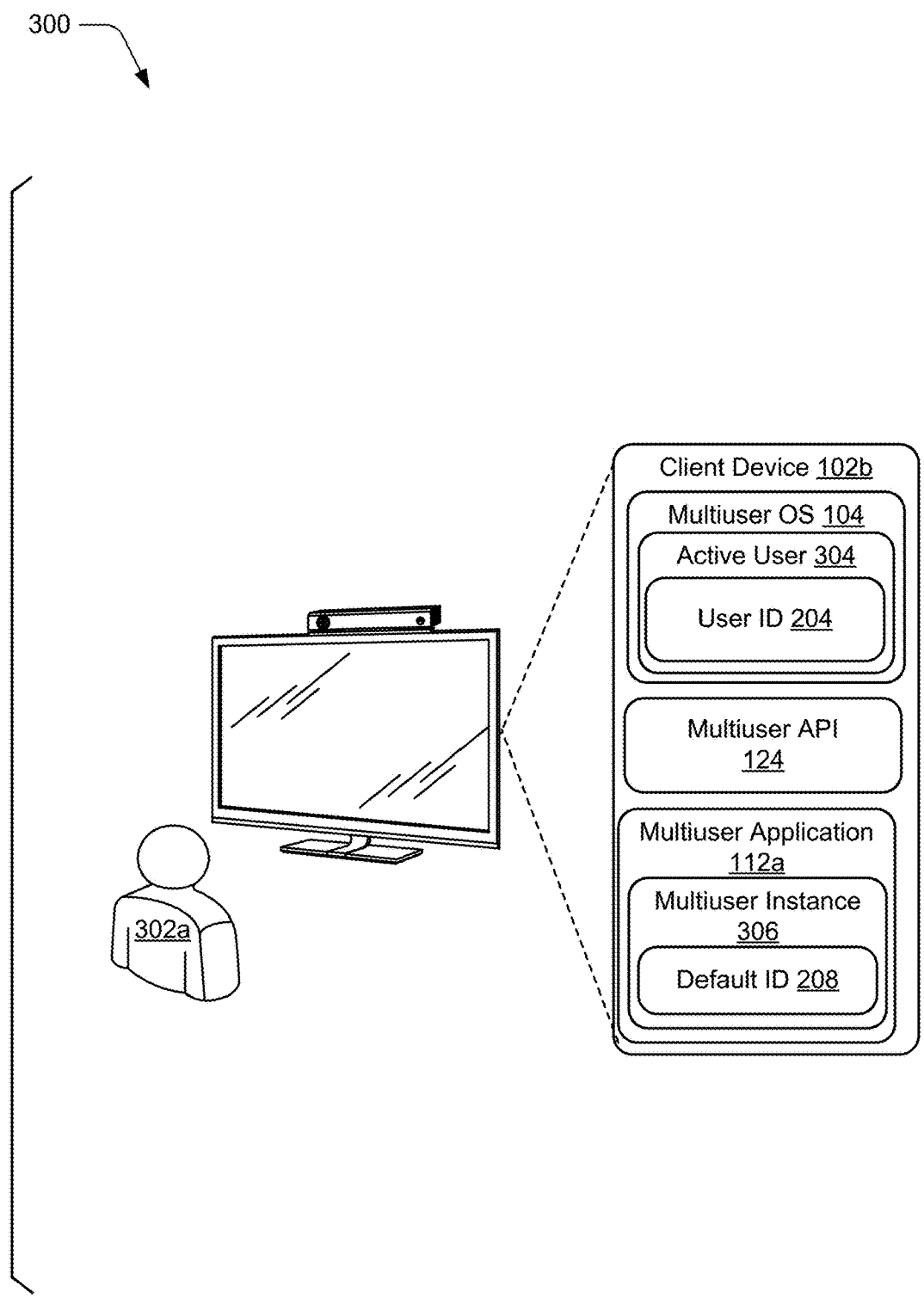
FIG. 3 depicts an example implementation scenario for user interaction with a multiuser application in accordance with one or more embodiments.

FIG. 3 depicts an example scenario 300 for user interaction with a multiuser application in accordance with one or more implementations. In the scenario 300, a user 302a authenticates with the multiuser OS 104 of the client device 102b using the user ID 204. Thus, the user ID 204 is designated as an active user 304 of the multiuser OS 104. In at least some implementations, designating the user ID 204 as the active user 304 causes a functional and visual environment of the multiuser OS 104 to be customized to the user ID 204. For example, user settings specific to the user ID 204 can be applied to the multiuser OS 104. Examples of user settings include user preferences, user content, user applications, user permissions (e.g., file permissions, network location permissions, and so forth), user-specified visual arrangement, and so forth.

Continuing with the scenario 300, the user 302a performs an action to initiate execution of the multiuser application 112a, which causes a multiuser instance 306 of the multiuser application 112a to be launched. Generally, the multiuser instance 306 represents a running instance of the multiuser application 112a. Similarly to the scenario 200 discussed above, the multiuser instance 306 launches as the default ID 208. The multiuser instance 306, for example, is not authenticated to one specific user. The multiuser OS 104, however, communicates with the multiuser instance 306 via the multiuser API 124 to notify the multiuser instance 306 that the user ID 204 is the active user 304. This causes the multiuser instance 306 to tailor certain settings of the multiuser instance 306 to the user ID 204. Examples of such settings include user preferences, user content, user applications, user permissions (e.g., file permissions, network location permissions, and so forth), user-specified visual arrangement, and so forth. Thus, the multiuser instance 306 executes based on the default ID 208, but can provide certain customized settings based on the user ID 204 being the active user 304. The user 302a, for example, can interact with the multiuser instance 306 in various ways, such as to access the user's content, files, network locations, and so forth.

As further detailed below, multiple users can interact with the multiuser instance 306, and different active users of the multiuser OS 104 can be designated while the multiuser instance 306 is active.

Figure 4:
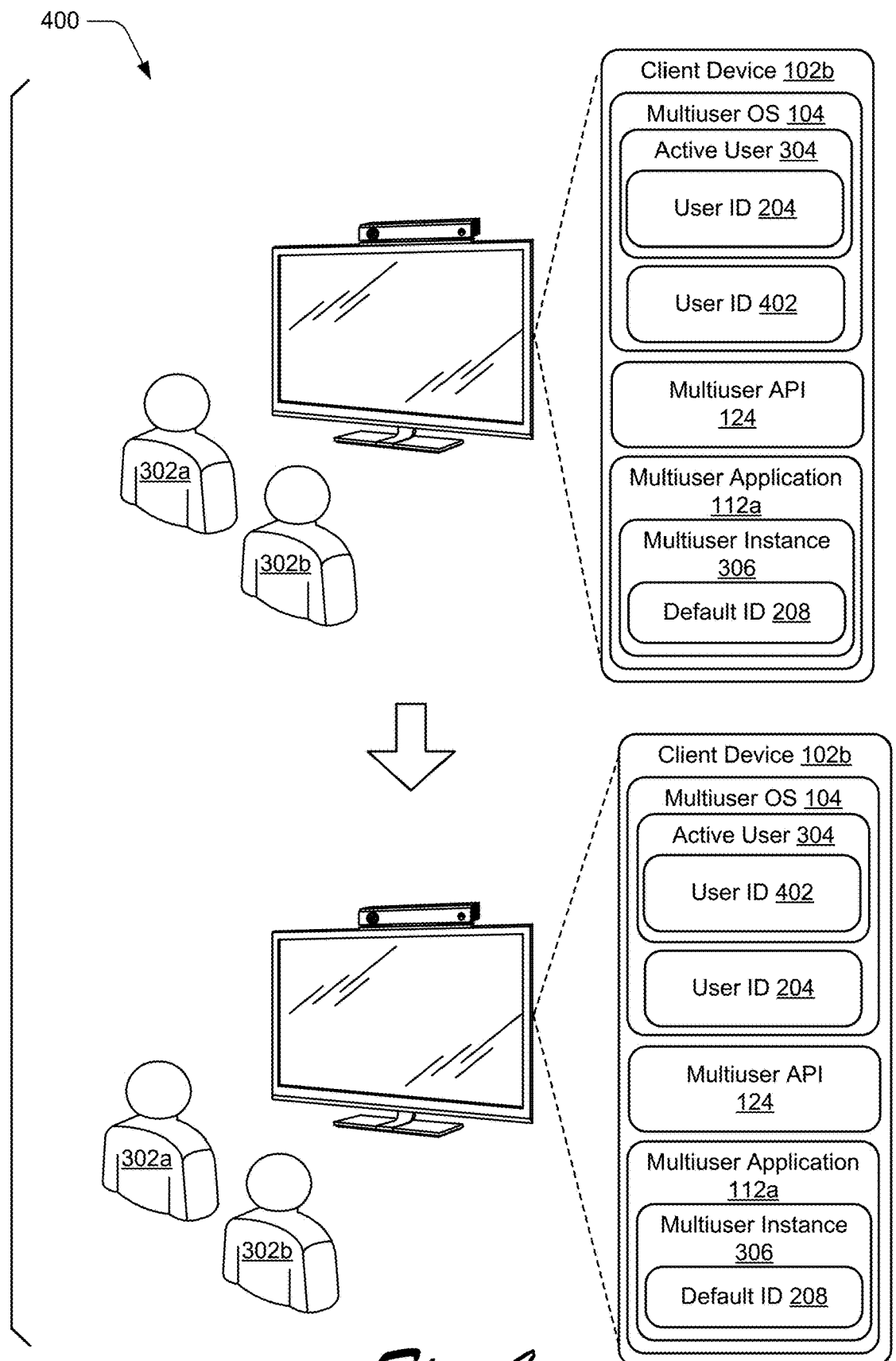
FIG. 4 depicts an example implementation scenario for interaction by multiple users with a multiuser application in accordance with one or more embodiments.

FIG. 4 depicts an example implementation scenario 400 for interaction by multiple users with a multiuser application in accordance with one or more implementations. Generally, the scenario 400 represents a continuation of the scenarios 200, 300.

In the upper portion of the scenario 400, and while the user ID 204 is the active user 304 for the multiuser OS 104, another user 302b authenticates with the multiuser OS 104 via a user ID 402. In this particular implementation, the user ID 204 remains the active user 304, and the user IDs 204, 402 are authenticated with the multiuser OS 104. According to various implementations, both users 302a, 302b may interact with the multiuser instance 306 via their respective user IDs 204, 402 as recognized by the multiuser OS 104.

In at least some implementations, user interaction with the multiuser instance 306 is implemented via an input device and/or input mechanism that is linked to a specific user. For instance, the users 302a, 302b each use different respective input devices that are tied to their respective user IDs 204, 402 such that when each of the users interact with the client device 102b, the multiuser OS 104 recognizes the interaction as being linked to one of the user IDs 204, 402. Examples of an input device include a mouse, a digital pen, a game controller, and so on.

When the user 302a, for example, interacts with the client device 102b to provide input to the multiuser instance 306, the multiuser OS 104 recognizes the interaction as being linked to the user ID 204. The multiuser OS 104 notifies the multiuser instance 306 via the multiuser API 124 that the input is from the user ID 204. Thus, the multiuser instance 306 attributes the input to the user ID 204. Generally, input attribution enables the multiuser instance 306 to perform various actions on behalf of the user ID 204, such as enabling access to settings and content linked to the user ID 204, enabling access to files and network locations linked to the user ID 204, and so forth.

Further, when the user 302b interacts with the client device 102b to provide input to the multiuser instance 306, the multiuser OS 104 recognizes the interaction as being linked to the user ID 402. The multiuser OS 104 notifies the multiuser instance 306 via the multiuser API 124 that the input is from the user ID 402. Thus, the multiuser instance 306 attributes the input to the user ID 402, such as to tailor the application experience to the user 302b. Thus, the multiuser instance 306 executes as the default ID 208, but is able to recognize interactions by specific users and tailor an application experience to the specific users.

Additionally or alternatively to using input devices to recognize user-specific input interactions, other types of interactions may be recognized by the multiuser OS 104, such as based on biometric recognition during user input (e.g., fingerprint recognition, eye recognition, facial recognition, and so forth), gesture recognition tied to specific user identities (such as detected via a camera of the client device 102b), voice recognition that differentiates between the users 302a, 302b, and so forth.

Proceeding to the lower portion of the scenario 400, the user 302b performs an action that causes the active user 304 to switch from the user ID 204 to the user ID 402. The user 302b, for instance, provides input to the multiuser OS 104 that causes the active user 304 to switch to the user ID 402. Various types of input to switch the active user 304 can be employed, such as selection of a selectable control displayed by the client device 102b, selection of a specific button on an input device, recognition of a specific user gesture, and so forth.

Accordingly, and responsive to switching the active user 304 to the user ID 402, the multiuser OS 104 is reconfigured to reflect that the user ID 402 is now the active user 304. For example, one or more settings of the multiuser OS 104 are changed to reflect that the user ID 402 is the active user 304. In at least some implementations, this includes visually reconfiguring a GUI of the multiuser OS 104 to reflect the user ID 402, such as displaying a user icon for the user ID 402. Further, various permissions for the multiuser OS 104 can be configured via the user ID 402, such as to allow the multiuser OS 104 to access content, files, network locations, and so forth, associated with the user ID 402.

Further to the scenario 400, the multiuser OS 104 notifies the multiuser instance 306 via the multiuser API 124 that the user ID 402 is the active user. Thus, with the user ID 402 as the active user 304, the user 302b can interact with the multiuser instance 306 in various ways, such as to access the user's content, files, network locations, and so forth. For instance, various functional and/or visual attributes of the multiuser instance 306 are reconfigured from being tailored to the user ID 204, to be tailored to the user ID 402.

While the user ID 402 is the active user 304, the users 302a, 302b may continue to interact with the multiuser instance 306, and the multiuser OS 104 can differentiate between the different interactions and identify for the multiuser instance 306 which of the user IDs 204, 402 that a particular input is attributed to. Thus, while the multiuser instance 306 is executing, multiple users may be concurrently authenticated with the multiuser OS 104, and the active user 304 may dynamically change multiple times during a single execution of the multiuser instance 306.

Figure 5:
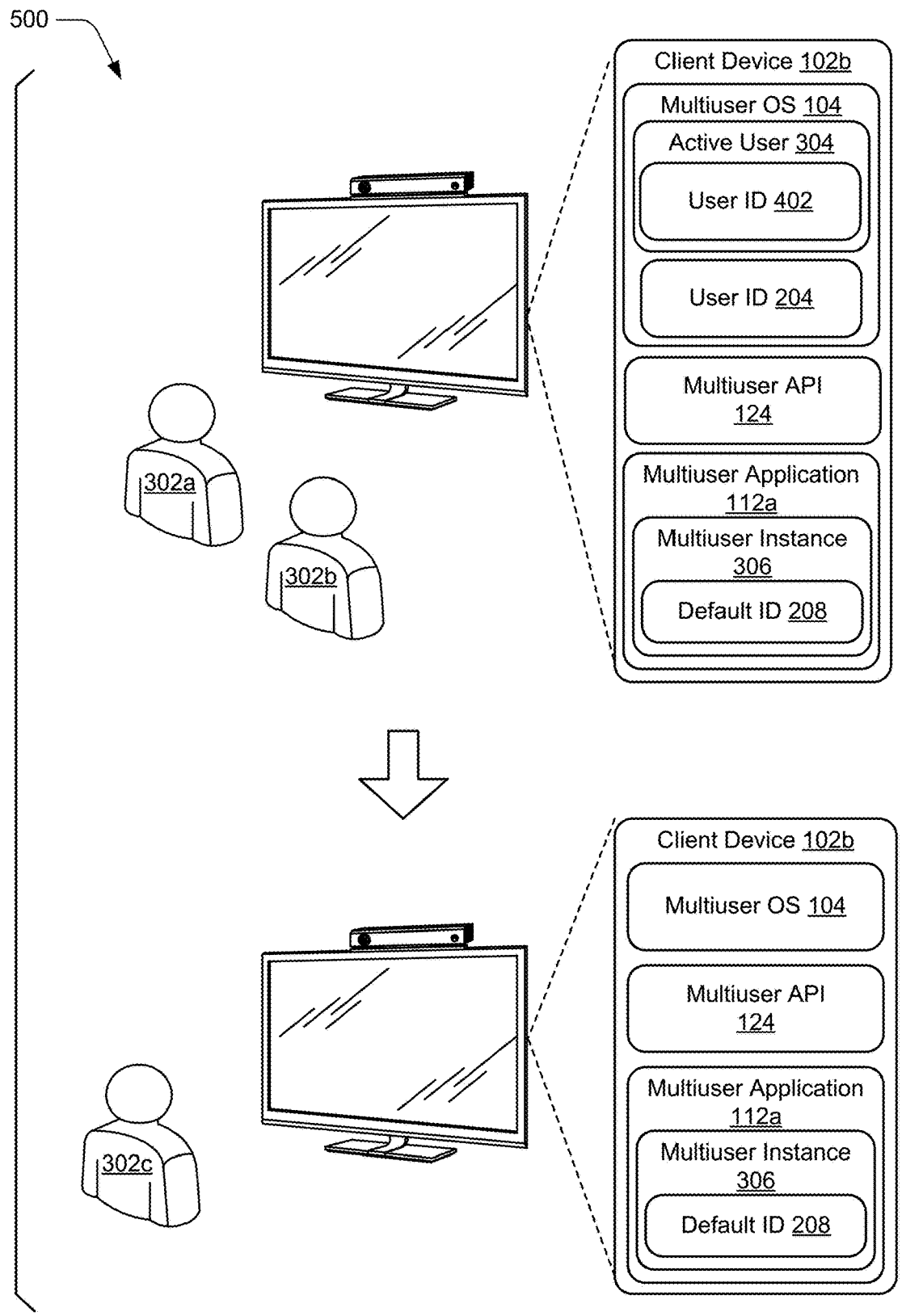
FIG. 5 depicts an example implementation scenario for interaction with a multiuser application in accordance with one or more embodiments.

FIG. 5 depicts an example implementation scenario 500 for interaction with a multiuser application in accordance with one or more implementations. Generally, the scenario 500 represents a continuation of the scenarios 200-400.

In the upper portion of the scenario 500, the multiuser instance 306 is still active on the client device 102b, and the users 302a, 302b are authenticated with the multiuser OS 104 via their respective user IDs 204, 402. Further, the user ID 402 is the active user 304 for the multiuser OS 104.

Proceeding to the lower portion of the scenario 500, the users 302a, 302b log out of the multiuser OS 104 such that the user IDs 204, 402 are no longer authenticated with the multiuser OS 104.

In at least some implementations, when the users 302a, 302b log out and are no longer authenticated with the multiuser instance 306, the multiuser OS 104 is reconfigured to reflect that the multiuser instance 306 is executing in an unauthenticated state. For instance, various permissions that were available when the users 302a, 302b were authenticated are no longer available. Further, various system settings that were applied with the users 302a, 302b were authenticated are reconfigured to reflect a default, unauthenticated system state.

Even though the users 302a, 302b are no longer authenticated, the multiuser instance 306 remains active and users (including the users 302a, 302b, as well as other users) may continue to interact with the multiuser instance 306 as the default ID 208. For instance, in the scenario 500, an unauthenticated user 302c provides input to the client device 102b to interact with the multiuser instance 306. Thus, the multiuser OS 104 detects that the input is from an unauthenticated user, and notifies the multiuser instance 306 that input is received from an unauthenticated user. Thus, the multiuser instance 306 can process the input as input from an unauthenticated user, such as to provide default system functionality based on the unauthenticated input.

While the scenario 500 is discussed with reference to deauthentication of the users 302a, 302b, it is to be appreciated that unauthenticated input can be received while the users 302a, 302b are authenticated with the multiuser OS 104. The multiuser OS 104, for instance, can differentiate between input from the authenticated users 302a, 302b, and input from the unauthenticated user 302c. Further, the multiuser OS 104 can notify the multiuser instance 306 as which of the users 302a, 302b, or 302c provided a particular input.

In at least some implementations, the users 302a, 302b may reauthenticate and additional users may authenticate with the multiuser OS 104 to enable authenticated interaction with the multiuser instance 306 and during the single execution of the multiuser instance 306.

Thus, the scenarios 300-500 illustrate that a multiuser OS enables dynamic authentication and deauthentication, and a multiuser application is executable to allow for multiuser interactions, all during a single execution of the multiuser application. For instance, the scenarios 300-500 are implemented during a continuous execution of the multiuser instance 306 and without requiring a restart of the multiuser application 112a to enable different users to authenticate with the multiuser OS 104a and interact with the multiuser instance 306. Further, the multiuser application 112a can run as the multiuser instance 306 without requiring user authentication directly with the multiuser application 112a, and can receive notifications from the multiuser OS 104 of input from a specific user ID such that the multiuser instance 306 can attribute the input to the specific user ID without the user ID being authenticated with the multiuser instance 306.

Having discussed some example implementation scenarios, consider now a discussion of some example procedures in accordance with one or more embodiments. The example procedures may be employed in the environment 100 of FIG. 1, the system 1400 of FIG. 14, and/or any other suitable environment. The procedures, for instance, represent example procedures for implementing the implementation scenarios described above. In at least some implementations, the steps described for the various procedures are implemented automatically and independent of user interaction. According to various implementations, the procedures may be performed locally (e.g., at the client device 102), at a network-based service, and/or via cooperation between the client device 102 and a network-based service.

Figure 6:
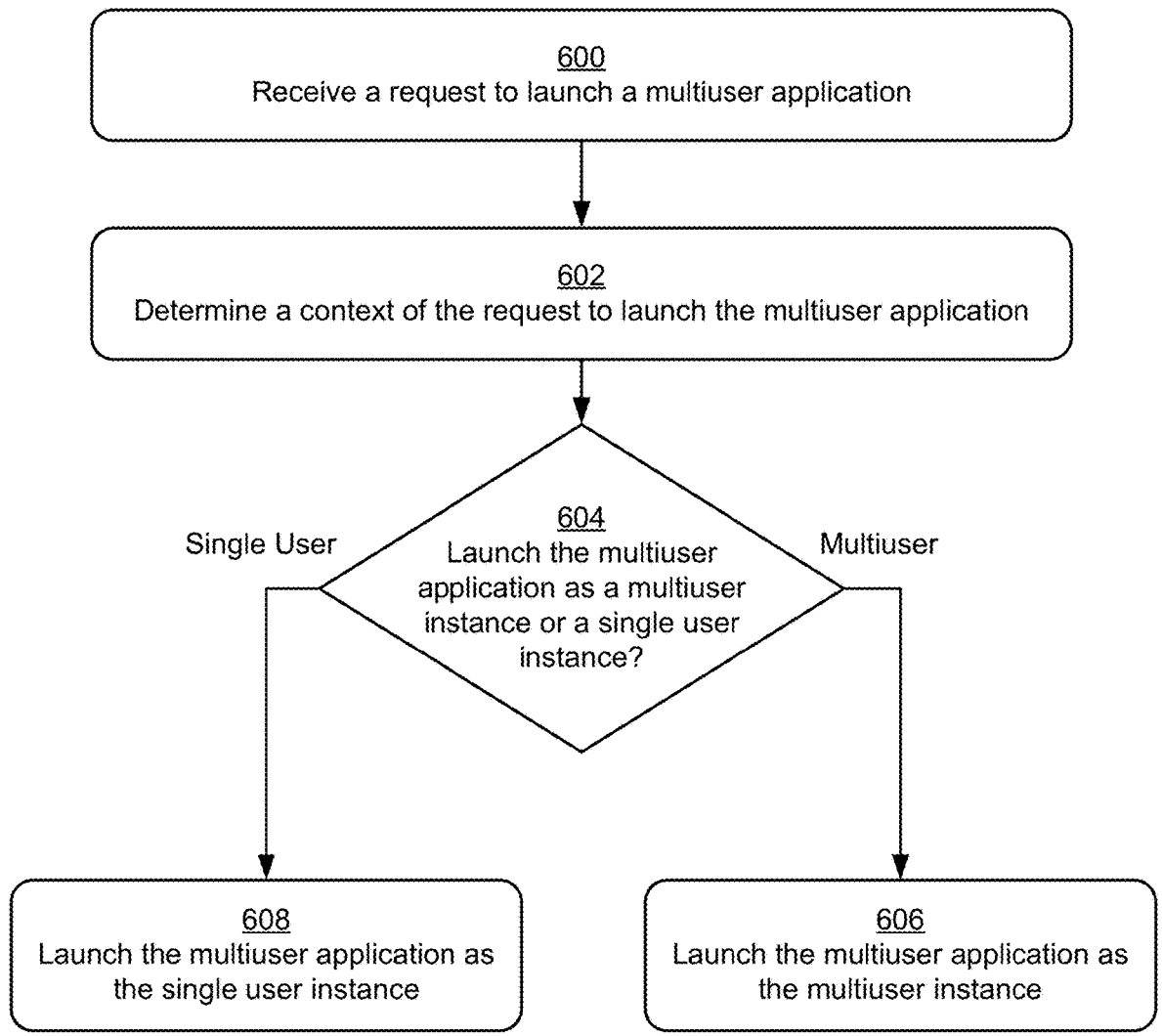
FIG. 6 is a flow diagram that describes steps in a method for optimizing encoding of obfuscated media in accordance with one or more embodiments.

FIG. 6 is a flow diagram that describes steps in a method for launching a multiuser application in accordance with one or more implementations. In at least some implementations, the method can be performed by the multiuser OS 104 executing on the client device 102.

Step 600 receives a request to launch a multiuser application. A user, for instance, interacts with the client device 102 to perform an action to initiate launching a multiuser application. Examples of such an action include selecting an icon (e.g., a tile) that represents the multiuser application, providing a gesture or voice input requesting the launch, and so forth. Alternatively or additionally, the request to launch the multiuser application can be initiated by an automated process, such as from a different application.

Step 602 determines a context of the request to launch the multiuser application. Generally, different contexts can be considered, such as a device type of a device on which the multiuser application is to be launched, a default setting of the multiuser application, a user preference for a way to launch the multiuser application, and so forth.

Step 604 ascertains whether to launch the multiuser application as a multiuser instance or a single user instance based on the context of the request. The application policies 108, for example, can be evaluated based on the context of the request to ascertain whether to launch the multiuser application as a multiuser instance or a single user instance. Generally, the application policies 108 specify contexts in which the multiuser application is to be launched as a multiuser instance, and different contexts in which the multiuser application is to launch as a single user instance.

For instance, consider that the application policies 108 specify that for certain device types, the multiuser application is to launch as a multiuser instance. Examples of device types for a multiuser instance include devices that are designed for concurrent multiuser interaction scenarios, such as large-scale touchscreen devices, meeting room collaboration devices, virtual reality devices (e.g., a virtual reality headset device), and so forth. Further, consider that the application policies 108 specify that for other device types, the multiuser application is to launch as a single user instance. Examples of device types for a single user instance include devices that are designed for single user interaction scenarios, such as small-scale touchscreen devices (e.g., a tablet device), smartphones, desktop computers, wearable devices (e.g., a smart watch), and so forth. Thus, based on a typical usage scenario for a particular device, the multiuser application can be launched into either a multiuser instance or a single user instance.

If the context of the request indicates that the multiuser application is to launch as a multiuser instance ("Multiuser"), step 606 launches the multiuser application as the multiuser instance. In at least some implementations, the multiuser instance is launched and executes according to a default system ID, even if a user ID is authenticated with a device on which the multiuser instance is launched. As detailed throughout, multiple different user IDs can interact with the multiuser instance while the multiuser instance executes according to the default system ID.

If the context of the request indicates that the multiuser application is to launch as a single user instance ("Singe User"), step 608 launches the multiuser application as the single user instance. In at least some implementations, the single user instance is launched and executes according to a user ID that is authenticated with a device on which the multiuser instance is launched.

Figure 7:
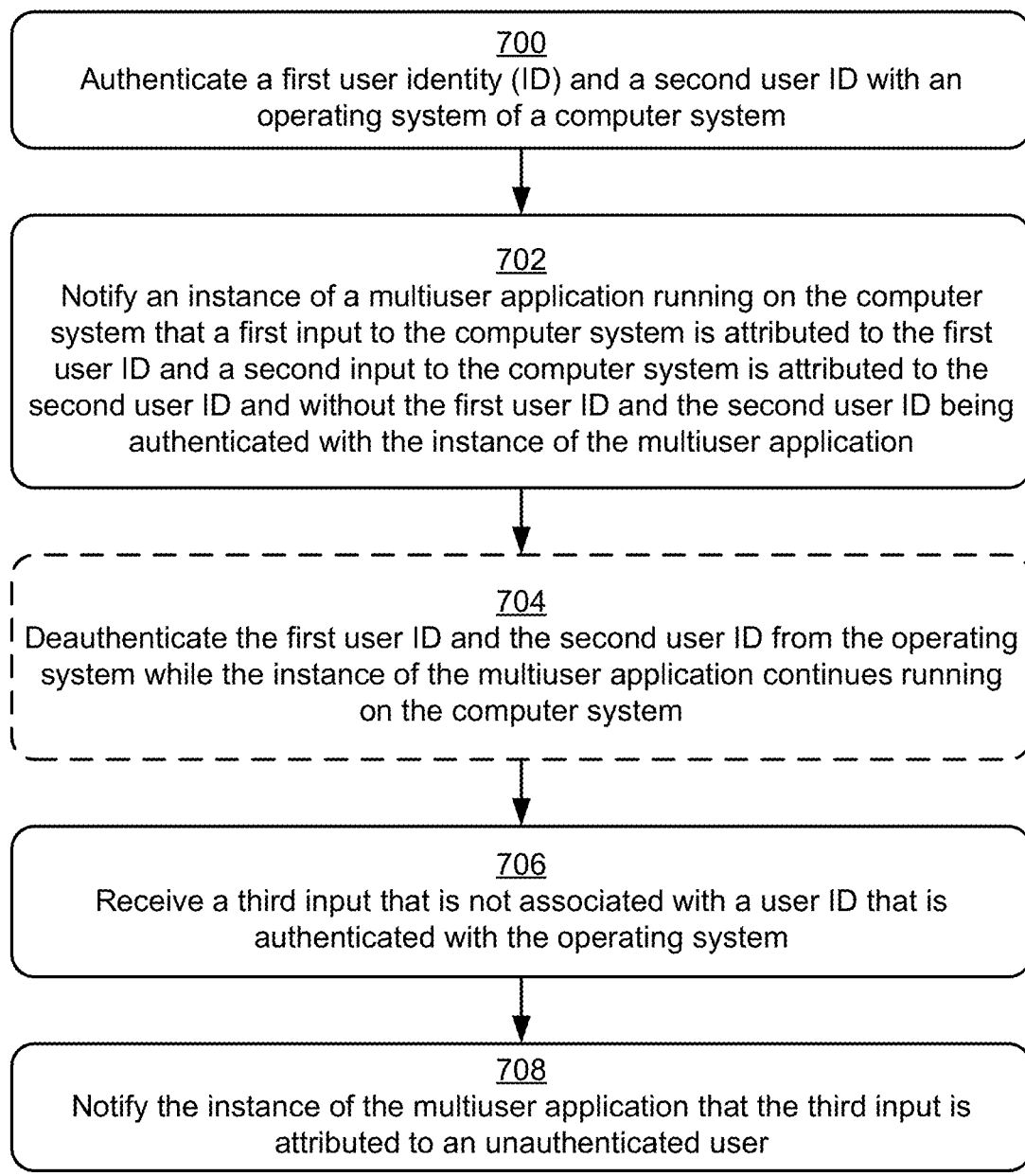
FIG. 7 is a flow diagram that describes steps in a method for interaction with a multiuser application in accordance with one or more embodiments.

FIG. 7 is a flow diagram that describes steps in a method for interaction with a multiuser application in accordance with one or more implementations. In at least some implementations, the method can be performed by the multiuser OS 104 executing on the client device 102.

Step 700 authenticates a first user identity (ID) and a second user ID with an operating system of a computer system. Different users, for example, interact and authenticate with the client device 102, such as by providing different authentication factors to the client device 102 to authenticate with the multiuser OS 104.

Step 702 notifies an instance of a multiuser application running on the computer system that a first input to the computer system is attributed to the first user ID and a second input to the computer system is attributed to the second user ID and without the first user ID and the second user ID being authenticated with the instance of the multiuser application. The multiuser OS 104, for instance, detects input from different users associated with the different user IDs and determines which user ID is associated with which input. As discussed above, the multiuser OS 104 can differentiate inputs associated with different user IDs in various ways, such as based on input devices associated with different users, biometric information, and so forth.

Thus, the multiuser OS 104 notifies the instance of the multiuser application that specific inputs are linked to specific user IDs. In at least some implementations, communication between the multiuser OS 104 and the instance of the multiuser application occurs via the multiuser API 124. The instance of the multiuser application can then perform various actions based on the input, such as to tailor an application experience to the first user ID and/or the second user ID.

Step 704 deauthenticates the first user ID and the second user ID from the operating system while the instance of the multiuser application continues running on the computer system. Users associated with the first user ID and the second user ID, for example, sign out of the operating system such that the user IDs are no longer authenticated with the operating system. The instance of the multiuser application, however, continues to execute. In at least some implementations, step 704 is optional.

Step 706 receives a third input that is not associated with a user ID that is authenticated with the operating system. An unauthenticated user, for example, provides input to the client device 102. The multiuser OS 104 detects the input and determines that the input is not associated with an authenticated user ID. For instance, when the third user input is received, no user IDs are currently authenticated with the multiuser OS 104. Alternatively, a user ID is authenticated with the multiuser OS 104, but the third input is received from a user that is not associated with the authenticated user ID.

In at least some implementations, step 704 is optional. For instance, while the first user ID and the second user ID are still authenticated with the multiuser OS 104, the third input can be received from a different user that is not authenticated with the multiuser OS 104. Thus, the multiuser OS 104 can differentiate between an input from an authenticated user and an input from an unauthenticated user.

Step 708 notifies the instance of the multiuser application that the third input is attributed to an unauthenticated user. The multiuser OS 104, for example, notifies the instance of the multiuser application that the input is from a user that is not authenticated. The instance of the multiuser application can process the input as associated with an unauthenticated user, such as to provide default application functionality that is not tailored to a specific user.

Thus, implementations for application interaction platform described herein provide a multiuser interaction platform that enables multiuser applications to be designed that can execute in either a multiuser mode or a single user mode dependent on various criteria. Further, using a multiuser OS that handles user authentication and user IDs enables multiuser applications to receive input that is attributed to different user IDs without requiring the user IDs to be authenticated directly with the multiuser application.

Figure 8:
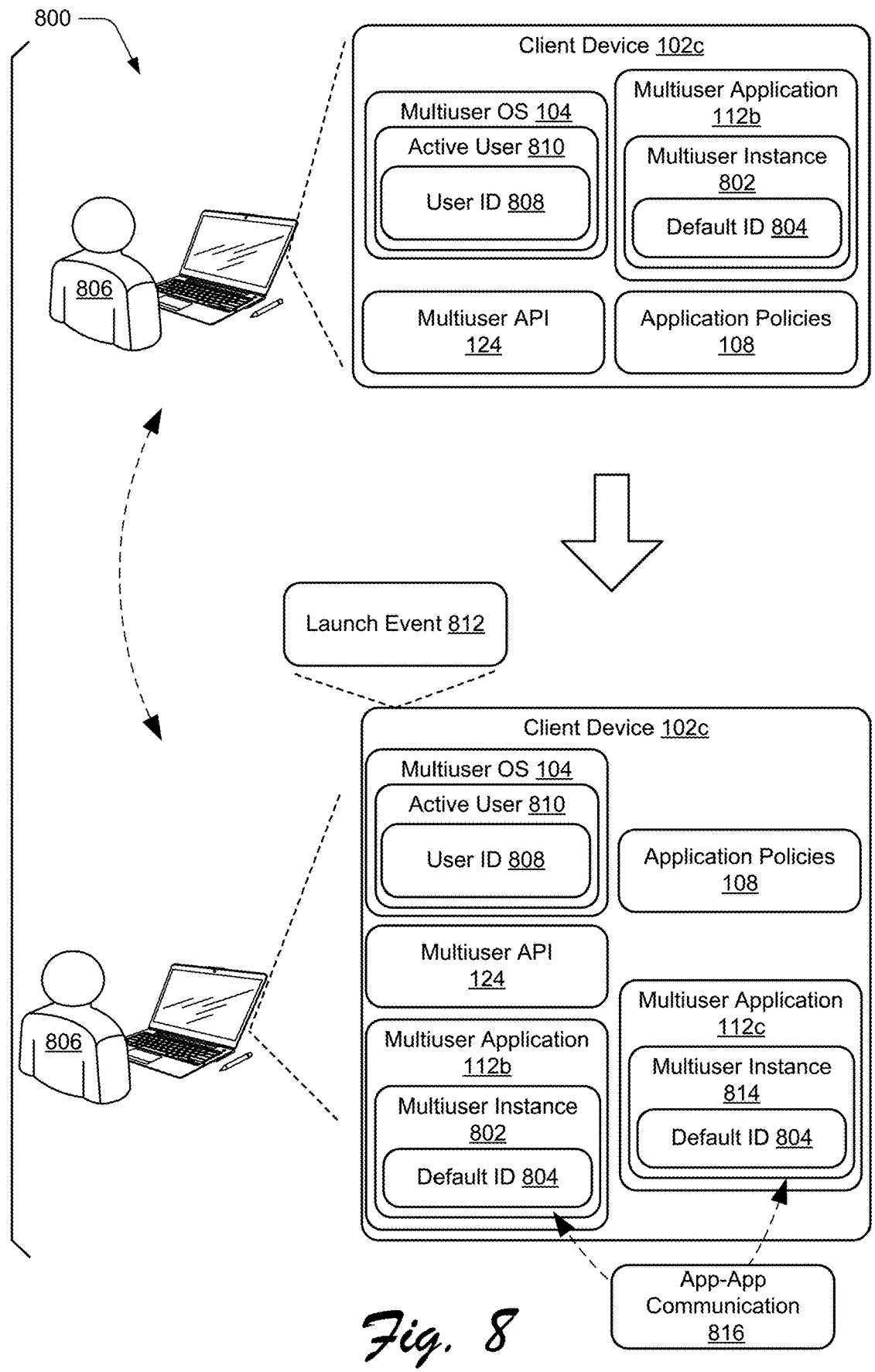
FIG. 8 depicts an example implementation scenario for application-to-application launching on a single device in accordance with one or more embodiments.

FIG. 8 depicts an example implementation scenario 800 for application-to-application ("app-app") launching on a single device in accordance with one or more implementations. In at least some implementations, the scenario 800 can be implemented in conjunction with the scenarios described above.

The upper portion of the scenario 800 includes a client device 102c running a multiuser instance 802 of a multiuser application 112b. Similarly to the scenarios described above, the multiuser instance 802 runs as a default ID 804, which represents a default system ID used by the client device 102c. Further, a user 806 is authenticated with the multiuser OS 104 with a user ID 808. The user ID 808, for instance, is designated as an active user 810 for the multiuser OS 104. Different attributes of an active user of the multiuser OS 104 are detailed above.

Proceeding to the lower portion of the scenario 800, a launch event 812 occurs that causes the multiuser instance 802 to launch an instance of a multiuser application 112c. Generally, the launch event 812 represents an event that is fired from the multiuser instance 802 and that causes an instance of the multiuser application 112c to be launched. The user 806, for example, performs an action using the multiuser instance 802 that requests access to content and/or functionality that is available via the multiuser application 112c.

For instance, consider that the multiuser application 112b is a collaboration application and that a hyperlink or other selectable link is presented via the multiuser instance 802. The user 806 selects the hyperlink, which represents a request to navigate to a website identified by the hyperlink. Accordingly, the multiuser instance 802 initiates a request to launch an instance of the multiuser application 112c and to navigate the multiuser application 112c to the website. The multiuser application 112c, for example, represents a web browser or other web-enabled application. Thus, the multiuser instance 802 communicates the request and the hyperlink to the multiuser OS 104, such as via the multiuser API 124. The multiuser OS 104 then launches an instance of the multiuser application 112c.

In this particular scenario, the multiuser application 112c is launched as a multiuser instance 814. The multiuser OS 104, for example, causes the multiuser instance 814 to be launched in response to the launch event 812. Continuing the example above, the multiuser application 112c represents a web browser, and thus the multiuser instance 814 represents an instance of a web browser. Accordingly, the multiuser instance 814 is launched and navigated to a website identified by the received hyperlink. The multiuser instance 814, for example, presents a GUI that displays a webpage for the website.

According to various implementations, the multiuser OS 104 decides how to launch the multiuser application 112c based on the application policies 108. The application policies 108, for example, specify whether and how the multiuser application 112c is to be launched by another application. In this example, the application policies 108 specify launch contexts in which the multiuser application 112c is to be launched as a multiuser instance, and other launch contexts in which the multiuser application 112c is to be launched as a single user instance. As detailed above, a multiuser application can run as either a multiuser instance or a single user instance, dependent on different launch and execution contexts.

In the scenario 800, the multiuser instance 814 runs as the default ID 804. The user ID 808, for example, remains the active user 810 after the multiuser instance 814 is launched, but the multiuser instance 814 runs as the default ID 804. Thus, the user 806 may interact with the multiuser instance 814 as the active user 810 while the multiuser instance 814 executes as the default ID 804. Different attributes of interaction between an active user and a multiuser instance are described above. As detailed above, for example, different users may be concurrently authenticated with the multiuser OS 104 and may interact with the multiuser instance 814 as authenticated users.

Further to the scenario 800, application-to-application (app-app) communication 816 occurs between the multiuser instance 802 and the multiuser instance 814. Generally, the app-app communication 816 enables the multiuser instance 802 and the multiuser instance 814 to exchange various types of information, such as context information, content, changes in application state, and so forth. The app-app communication 816, for example, represents two-way communication between the multiuser instance 802 and the multiuser instance 814. In at least some implementations, the multiuser OS 104 brokers the app-app communication 816 such that the app-app communication 816 is passed between the multiuser instance 802 and the multiuser instance 814 via the multiuser OS 104, such as via calls to the multiuser API 124 by the multiuser instance 802 and/or the multiuser instance 814.

Figure 9:
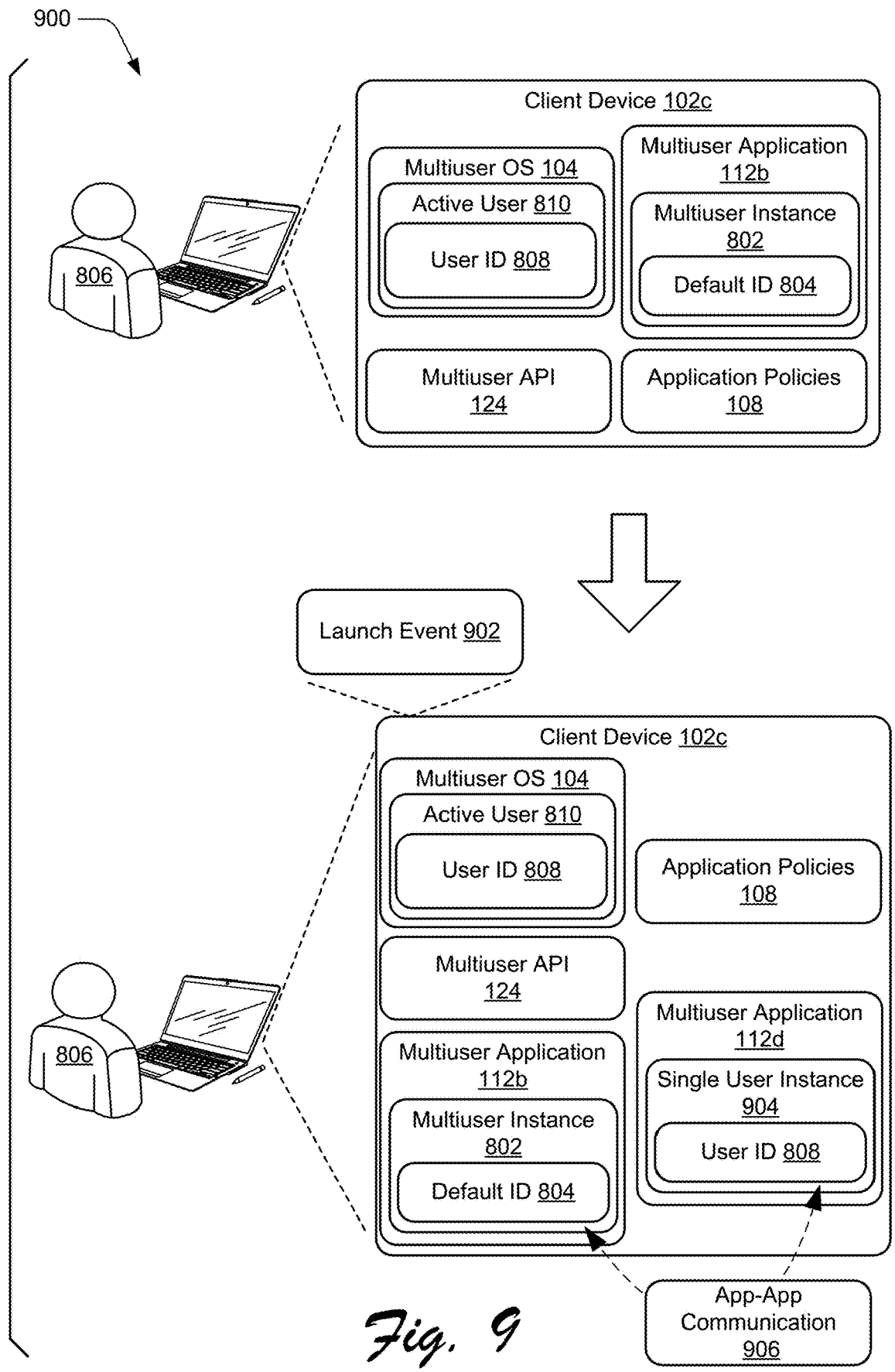
FIG. 9 depicts an example implementation scenario for application-to-application launching on a single device in accordance with one or more embodiments.

FIG. 9 depicts an example implementation scenario 900 for app-app launching on a single device in accordance with one or more implementations. In at least some implementations, the scenario 900 can be implemented in conjunction with the scenarios described above.

The upper portion of the scenario 900 includes the client device 102c running the multiuser instance 802 of the multiuser application 112b and according to the default ID 804. Further, the user 806 is authenticated via the user ID 808 with the multiuser OS 104.

Proceeding to the lower portion of the scenario 900, a launch event 902 occurs that causes the multiuser instance 802 to launch an instance of a multiuser application 112d. The multiuser instance 802, for example, communicates the launch event to the multiuser OS 104, such as via the multiuser API 124. Based on the context of the launch event 902 and/or the application policies 108, the multiuser OS 104 launches the multiuser application 112d as a single user instance 904. The application policies 108, for example, specify contexts in which the multiuser application 112d is to be launched as a multiuser instance, and other contexts in which the multiuser application 112d is to be launched as a single user instance.

Further to the scenario 900, the single user instance 904 executes according to the user ID 808. For instance, launching the single user instance 904 from the multiuser instance 802 causes the single user instance 904 to authenticate with the user ID 808. Thus, the single user instance 904 can execute as authenticated to the user ID 808, such as to present an application experience that is tailored to the user ID 808.

According to various implementations, the user ID 808 flows from the multiuser OS 104 to the single user instance 904, such as part of the launch event 902 and via the multiuser API 124. For example, further to launching the single user instance 904, the multiuser OS 104 passes the user ID 808 to the single user instance 904 to indicate that the user ID 808 is authenticated with the multiuser OS 104. Accordingly, the single user instance 904 executes based on the user ID 808, such as to tailor application functionality and permissions to the user ID 808.

Further to the scenario 900, app-app communication 906 occurs between the multiuser instance 802 and the single user instance 904. Generally, the app-app communication 906 enables the multiuser instance 802 and the single user instance 904 to exchange various types of information, such as context information, content, changes in application state, and so forth. In at least some implementations, the user ID 808 is communicated to the single user instance 904 via the app-app communication 906.

Figure 10:
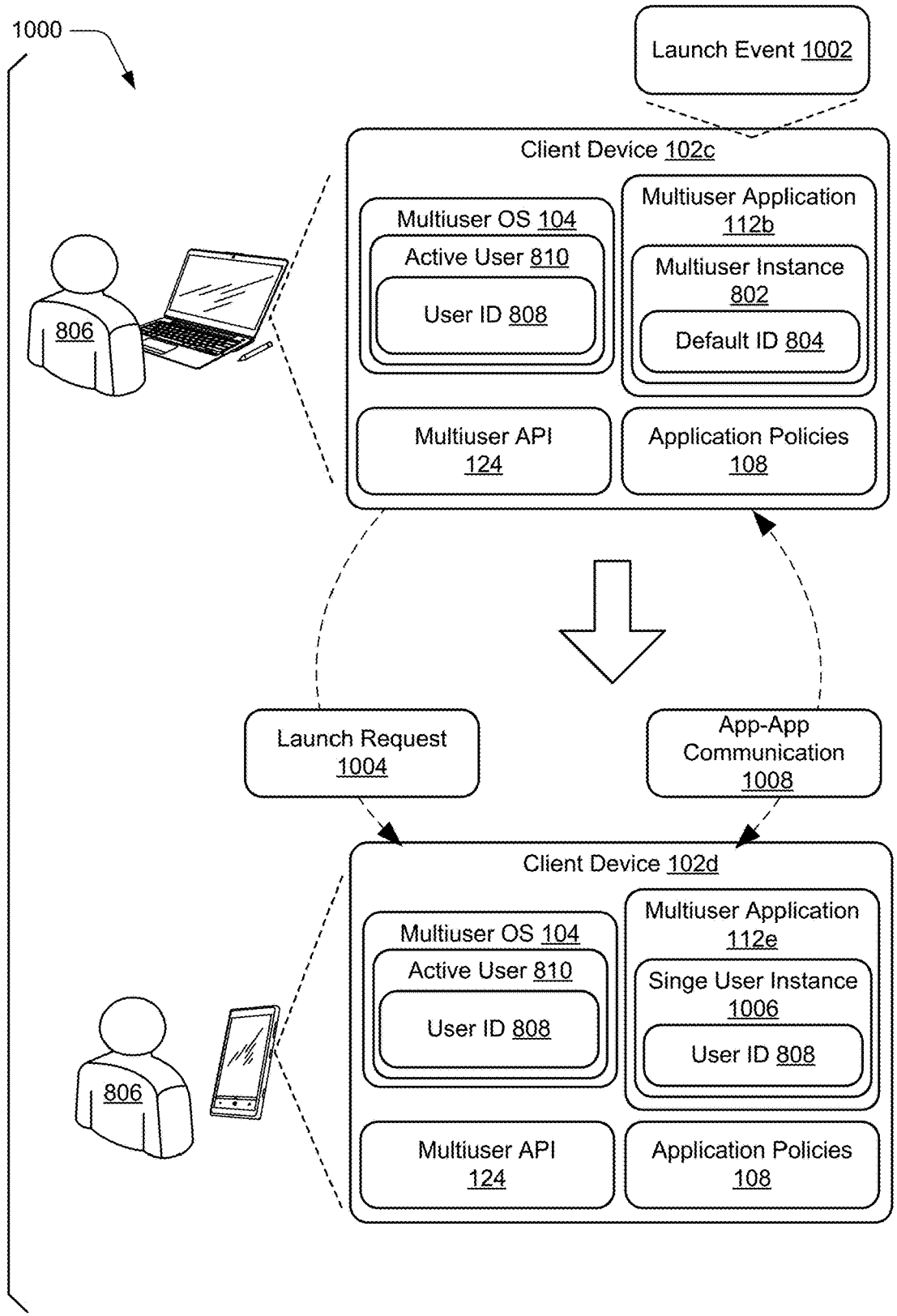
FIG. 10 depicts an example implementation scenario for application-to-application launching across multiple devices in accordance with one or more embodiments.

FIG. 10 depicts an example implementation scenario 1000 for app-app launching across multiple devices in accordance with one or more implementations. In at least some implementations, the scenario 1000 can be implemented in conjunction with the scenarios described above.

The upper portion of the scenario 1000 includes the client device 102c running the multiuser instance 802 of the multiuser application 112b and according to the default ID 804. Further, the user 806 is authenticated via the user ID 808 with the multiuser OS 104.

Proceeding to the lower portion of the scenario 1000, a launch event 1002 occurs that requests that an instance of a multiuser application 112e be launched on a client device 102d. The multiuser instance 802, for example, communicates the launch event 1002 to the multiuser OS 104, such as via the multiuser API 124. Generally, the launch event 1002 identifies the client device 102d and requests that an instance of the multiuser application 112e be launched on the client device 102d.

Accordingly, the multiuser OS 104 on the client device 102c generates a launch request 1004, and the client device 102c transmits the launch request 1004 to the client device 102d. According to various implementations, the launch request 1004 requests that an instance of the multiuser application 112e be launched on the client device 102d, and includes context information from the launch event 1002. The launch request 1004, for example, includes context information such as an identifier for the client device 102c, the user ID 808, an identifier for the multiuser applications 112b and/or 112e, a type of action that initiated the launch event 1002, and so forth.

Alternatively or additionally, the launch request 1004 specifies whether the multiuser application 112e is to launch as a multiuser instance or a single user instance. The multiuser OS 104 on the client device 102c, for example, determines based on the context of the launch event 1002 and/or the application policies 108 whether the multiuser application 112e is to launch on the client device 102d as a multiuser instance or a single user instance. Thus, the multiuser OS 104 may configure the launch request 1004 to specify whether the multiuser application 112e is to launch on the client device 102d as a multiuser instance or a single user instance.

Alternatively or additionally, the multiuser OS 104 on the client device 102d can process context information from the launch request 1004 and decide, such as based on the application policies 108, whether to launch the multiuser application 112e as a multiuser instance or a single user instance. The multiuser OS 104 on the client device 102d, for example, can apply context information from the launch request 1004 to determine whether to launch the multiuser application 112e as a multiuser instance or a single user instance. Thus, a decision to launch as a multiuser instance or a single user instance can be made remotely at the client device 102c, and/or locally at the client device 102d.

In this particular scenario, the multiuser application 112e is launched on the client device 102d as a single user instance 1006. For example, based on context information included in the launch request 1004, and/or local context information of the client device 102d, the multiuser OS 104 on the client device 102d launches the multiuser application 112e as the single user instance 1006. This is not to be construed as limiting, however, and the multiuser application 112e may alternatively launch on the client device 102d as a multiuser instance, such as based on different context information in the launch event 1002 and/or the launch request 1004, different application policies 108, and so forth.

Thus, the single user instance 1006 launches on the client device 102d and executes based on the user ID 808. User identification information, for example, flows from the client device 102*c* to the client device 102*d*, such as part of the launch request 1004. The single user instance 1006 can accordingly tailor its application experience to the user ID 808.

Further to the scenario 1000, app-app communication 1008 occurs between the multiuser instance 802 and the single user instance 1006. Generally, the app-app communication 1008 enables the multiuser instance 802 and the single user instance 1006 to exchange various types of information, such as context information, content, changes in application state, and so forth. The app-app communication 1008, for example, represents two-way transmission of information between the client device 102*c* and the client device 102*d*.

While the scenario 1000 is discussed with reference to launching a different application on the client device 102*d*, it is to be appreciated a different instance of the multiuser application 112*b* can be launched on the client device 102*d*. For example, consider the following implementation scenario.

Figure 11:
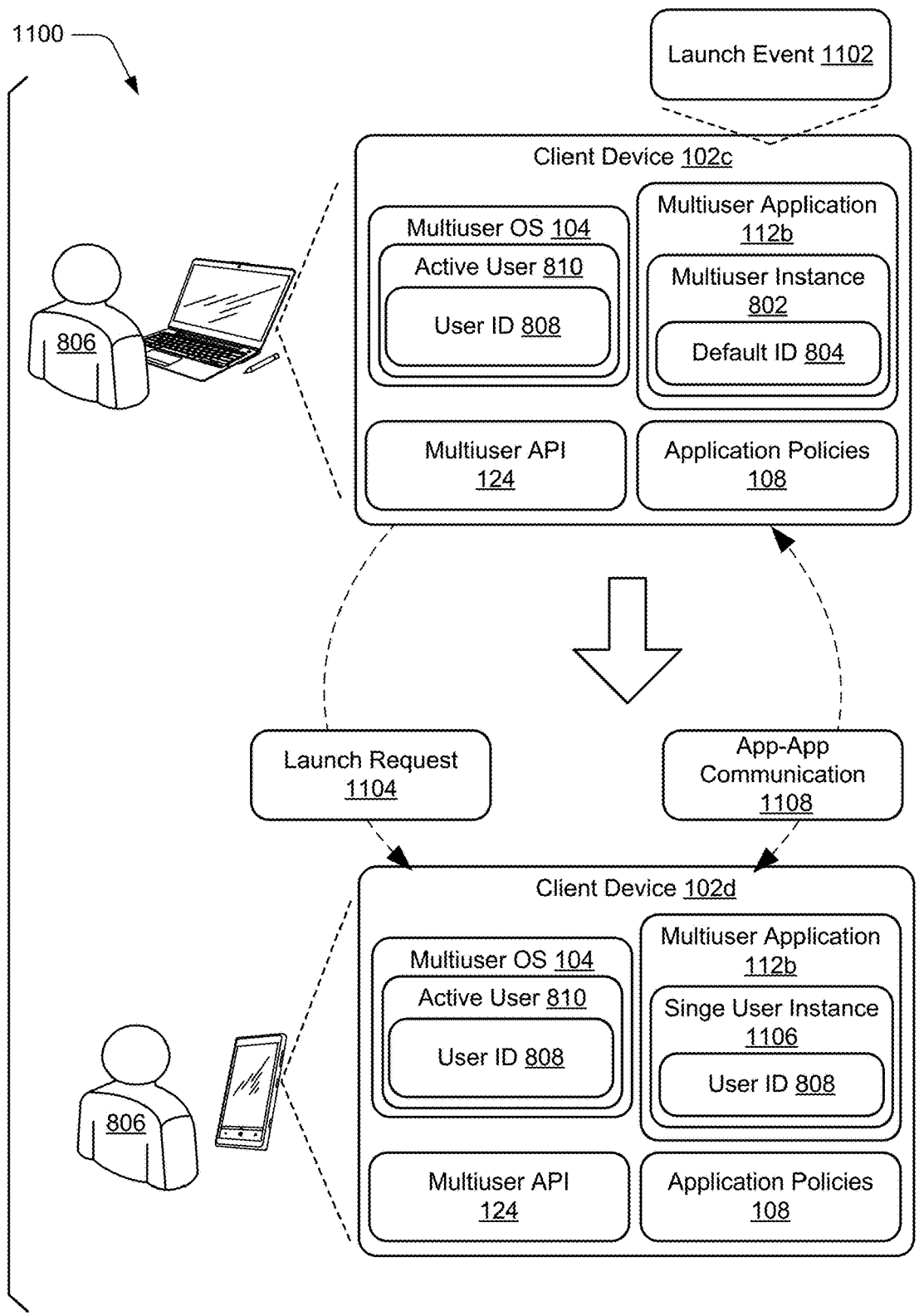
FIG. 11 depicts an example implementation scenario for application-to-application launching across multiple devices in accordance with one or more embodiments.

FIG. 11 depicts an example implementation scenario 1100 for app-app launching across multiple devices in accordance with one or more implementations. In at least some implementations, the scenario 1100 can be implemented in conjunction with the scenarios described above.

The upper portion of the scenario 1100 includes the client device 102*c* running the multiuser instance 802 of the multiuser application 112*b* and according to the default ID 804. Further, the user 806 is authenticated via the user ID 808 with the multiuser OS 104. The multiuser instance 802 generates a launch event 1102, example attributes of which are discussed above. In this particular example, the launch event 1102 requests launching of an instance of the application 112*b* on the client device 102*d*.

Proceeding to the lower portion of the scenario 1100, the multiuser OS 104 on the client device 102*c* generates a launch request 1104, and the client device 102*c* transmits the launch request 1104 to the client device 102*d*. Generally, the launch request 1104 requests launch of an instance of the multiuser application 112*b* on the client device 102*d*, and includes context information for the launch. In at least some implementations, the launch request 1104 indicates whether the multiuser application 112*b* is to launch on the client device 102*d* as a multiuser instance or a single user instance. Alternatively or additionally, a decision whether to launch the multiuser application 112*b* as a multiuser instance or a single user instance can be made locally on the client device 102*d*.

Accordingly, based on the launch request 1104, the client device 102*d* launches a single user instance 1106 of the multiuser application 112*b*. For example, based on context information from the launch request 1104 as applied to the application policies 108, the multiuser OS 104 launches the multiuser application 112*b* on the client device 102*d* as the single user instance 1106. Alternatively or additionally, local context information from the client device 102*d* can be applied to the application policies 108 to determine to launch the multiuser application 112*b* as the single user instance 1106.

According to various implementations, the single user instance 1106 executes on the client device 102*d* via the user ID 808, such as to enable the user 806 to access functionality and/or content based on settings and permissions for the user ID 808. The user ID 808, for example, flows from the multiuser OS 104 on the client device 102*c* to the multiuser OS 104 on the client device 102*d* (e.g., via the launch request 1104) to enable the single user instance 1106 to execute based on the user ID 808.

In at least some implementations, the launch request 1104 can identify an execution context to be used for executing the single user instance 1106 on the client device 102*d*. The single user instance 1106, for example, can execute to continue a user experience from the multiuser instance 802. For instance, content from the multiuser instance 802 (e.g., a file, an image, a video, audio content, and so forth) can be communicated to the single user instance 1106, such as via the launch request 1104. Thus, launching the single user instance 1106 can enable the user 806 to start a user experience on the multiuser instance 802, and to continue the user experience on the single user instance 1106.

Further to the scenario 1100, app-app communication 1108 occurs between the multiuser instance 802 and the single user instance 1106. Generally, the app-app communication 1108 enables the multiuser instance 802 and the single user instance 1106 to exchange various types of information, such as context information, content, changes in application state, and so forth. The app-app communication 1108, for example, represents two-way transmission of information between the client device 102*c* and the client device 102*d*.

In at least some implementations, changes in application context can be communicated via the app-app communication 1108. For example, consider that the user 806 interacts with the single user instance 1106 to change its execution context, such as be editing content presented by the single user instance 1106. The change in execution context can be communicated via the app-app communication 1108 from the single user instance 1106 to the multiuser instance 802. Thus, the multiuser instance 802 can update its own execution context based on the change in context information, such as to update content presented by the multiuser instance 802. Thus, app-app communication can be leveraged to enable different types and instances of applications to exchange content and context information, whether the applications are executing on the same device or on different devices.

The scenarios described above generally illustrate that techniques for application interaction platform described herein enable communication between different applications, such as for app-app launching, and for propagating context and content between applications. Although the scenarios are described with reference to launching an application from a multiuser instance, it is to be appreciated that implementations described herein can be employed to launch an application from a single user instance. For example, the scenarios 800-1100 can be implemented for launching an application from a single user instance of the multiuser application 112*b*. Further, the scenarios 800-1100 may be implemented for launching a multiuser application 112 from a single user application 114, and for launching a single user application 114 from a multiuser application 112. Generally, an instance of a single user application 114 will behave as a single user instance of a multiuser application 112 when utilized in the scenarios 800-1100.

Having described some example implementation scenarios, consider now some example procedures for application interaction platform in accordance with one or more implementations.

Figure 14:
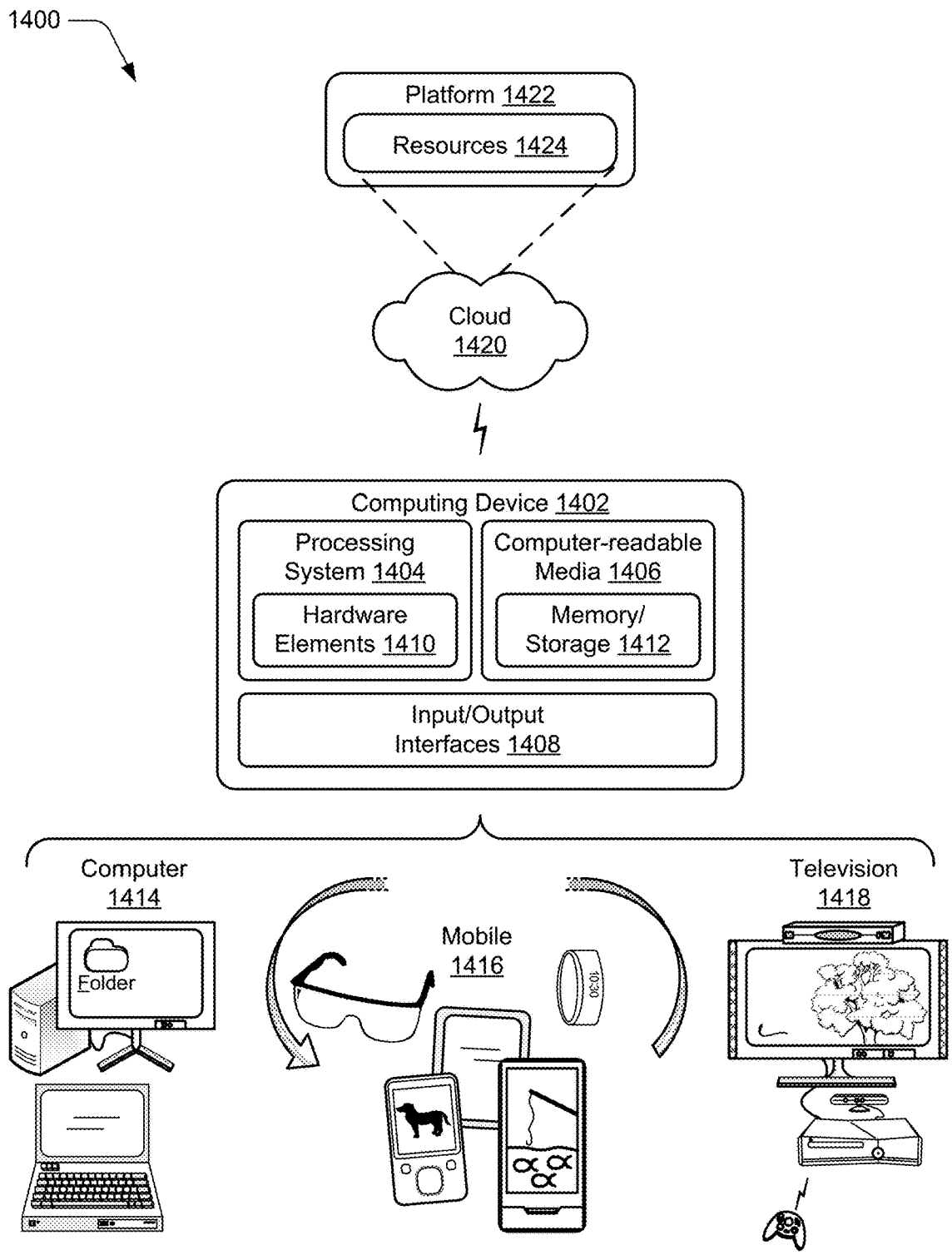
FIG. 14 illustrates an example system and computing device as described with reference to FIG. 1, which are configured to implement embodiments of techniques described herein.

The example procedures may be employed in the environment 100 of FIG. 1, the system 1400 of FIG. 14, and/or any other suitable environment. The procedures, for instance, represent example procedures for implementing the scenarios described above. In at least some implementations, the steps described for the various procedures are performed automatically and independent of user interaction. According to various implementations, the procedures may be performed locally (e.g., at the client device 102), at a network-based service, and/or via cooperation between the client device 102 and a network-based service.

Figure 12:
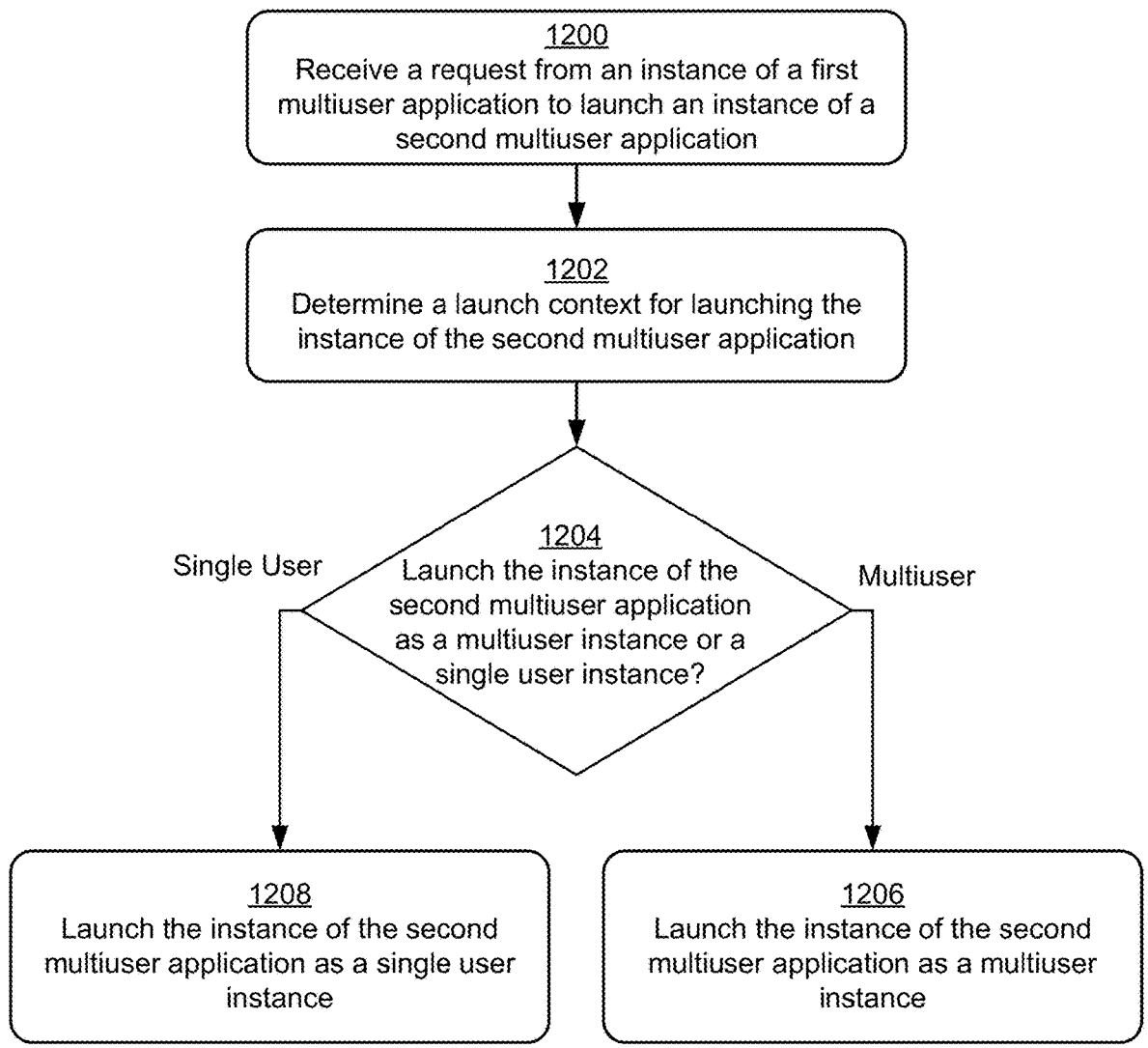
FIG. 12 is a flow diagram that describes steps in a method for application-to-application launching in accordance with one or more embodiments.

FIG. 12 is a flow diagram that describes steps in a method for app-app launching in accordance with one or more implementations. In at least some implementations, the method can be performed by the multiuser OS 104 executing on the client device 102.

Step 1200 receives a request from an instance of a first multiuser application to launch an instance of a second multiuser application. The multiuser OS 104, for example, receives the request from the first multiuser application, such as via the multiuser API 124. Generally, the request may be caused by various events. A user, for example, can provide input to the first multiuser application, which causes the first multiuser application to request launch of the second multiuser application. For instance, the user can request access to content and/or functionality that is available via the second multiuser application.

Alternatively, the request can be initiated automatically and independent of direct user input. For example, an automated event generated by the first multiuser application and/or the multiuser OS 104 can generate the request.

Step 1202 determines a launch context for launching the instance of the second multiuser application. Generally, the launch context represents various system state parameters that pertain to the launch request. Examples of different launch contexts include:

(1) User identity: an identity of a user that interacts with the first multiuser application and/or the second user application. Alternatively or additionally, the user identity represents a user ID that is authenticated with the multiuser OS 104 and/or one or more of the first multiuser application or the second multiuser application.

(2) Device type: a type of device (e.g., form factor) on which the first multiuser application executes and/or the second multiuser application is to execute. As discussed above with reference to the scenario 200, for example, a multiuser application can launch as either a multiuser instance or a single user instance, dependent on different device attributes. Examples of device-specific factors are discussed above in the discussion of the scenario 200.

(3) Application settings: settings of a particular multiuser application that initiates a request to launch another multiuser application, and/or settings of a multiuser application that is to be launched. The settings, for instance, may specify whether the second multiuser application is to launch as a multiuser instance or a single user instance. In at least some implementations, the settings may be context-specific, and may be dependent upon other launch contexts.

(4) User preference: a user preference of a user that interacts with the first multiuser application or the second multiuser application. In at least some implementations, the user preference is bound to a particular user ID. The user preference, for example, specifies whether a particular user prefers that the second multiuser application launch as a multiuser instance or a single user instance.

These launch contexts are presented for purpose of example only, and it is to be appreciated that various other launch contexts may be considered within the spirit and scope of the claimed implementations.

Step 1204 ascertains based on the launch context whether to launch the instance of the second multiuser application as a multiuser instance or a single user instance. The multiuser OS 104, for example, determines based on the launch context whether to launch the second multiuser application as a multiuser instance or a single user instance. For instance, the multiuser OS 104 applies the launch context to the application policies 108 to determine, based on the application policies 108, whether to launch the second multiuser application as a multiuser instance or a single user instance. The application policies 108, for example, specify launch contexts in which a multiuser application (e.g., the second multiuser application) is to launch as a multiuser instance, and other launch contexts in which a multiuser application is launch as a single user instance.

If the second multiuser application is to launch as a multiuser instance ("Multiuser") step 1206 launches the instance of the second multiuser application as a multiuser instance. The multiuser instance, for example, executes according to various attributes and behaviors of a multiuser instance of a multiuser application, examples of which are detailed above. In at least some implementations, the multiuser instance executes according to a default system identity.

If the second multiuser application is to launch as a single user instance ("Single User") step 1208 launches the instance of the second multiuser application as a single user instance. The single user instance, for example, executes according to various attributes and behaviors of a single user instance of a multiuser application, examples of which are detailed above. In at least some implementations, the single user instance executes according to a specific user ID, such as a user ID that is designated as an active user of the multiuser OS 104.

In at least some implementations, this method can be performed on a single device for app-app launching and execution on the single device. Alternatively or additionally, the method may be performed for app-app launching across multiple devices. The first multiuser application, for example, can be executing on a first device, and can request that an instance of the second multiuser application be launched on the second device. Thus, in at least some multi-device implementations, the various steps of the method may occur at a single device and in response to a request from another device to launch an instance of a multiuser application.

Figure 13:
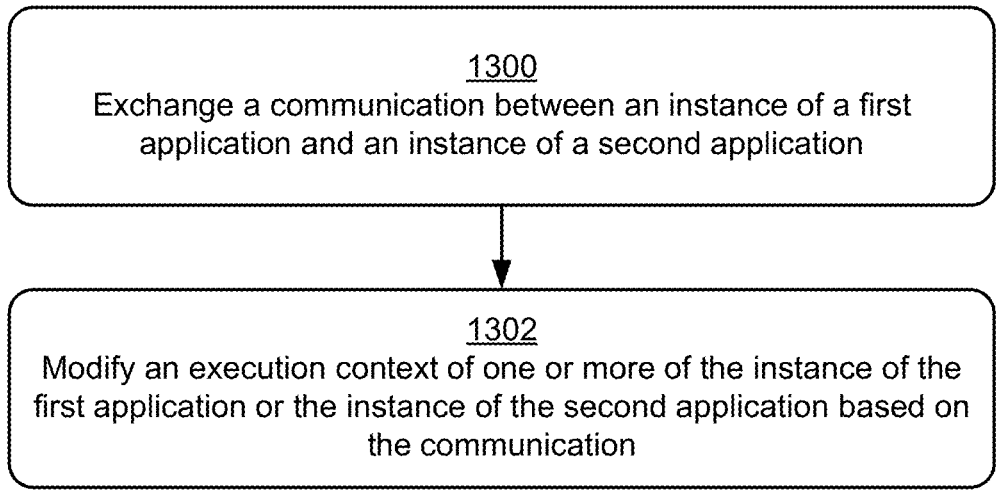
FIG. 13 is a flow diagram that describes steps in a method for application-to-application communication in accordance with one or more embodiments.

FIG. 13 is a flow diagram that describes steps in a method for app-app communication in accordance with one or more implementations. In at least some implementations, the method can be performed via the multiuser OS 104 and/or one of the platform APIs 122 executing on one or more client devices 102.

Step 1300 exchanges a communication between an instance of a first application and an instance of a second application. Generally, one or more of the first application or the second application represents a multiuser application. The communication, for example, can be between different instances of two different multiuser applications, different instances of a same multiuser application, an instance of a single user application and an instance of a multiuser application, and so forth.

In at least some implementations, the communication includes state information and/or content from one of the applications. The communication, for example, can include a current execution state of one of the application instances. Alternatively or additionally, the communication can include and/or identify content being output by one of the application instances.

Consider, for example, that one of the application instances is providing a game play experience. The application instance can communicate a state of the game play to the other application instance to allow the other application instance to present the game play experience, such to allow a user to resume the game play experience via the other application instance. As another example, one of the application instances can provide a media output experience, such as outputting video, audio, images, and so forth. The application instance can communicate a state of the media output experience to the other application instance, to cause the other application instance to present the media output experience.

As yet a further example, one of the application instances can provide a user interaction experience, such as part of a real-time communication session, e.g., a voice/video over Internet Protocol (VoIP) call. The application instance can communicate a state of the communication session to the other application instance to cause the other application instance to present the communication experience. The other application, for example, can resume the communication experience from a state at which the communication was exchanged (e.g., transmitted) between the application instances.

These particular app-app communications are presented for purpose of example only, and app-app communication can be leveraged to relay a variety of different types of information between application instances.

Step 1302 modifies an execution context of one or more of the instance of the first application or the instance of the second application based on the communication. Information included in the communication, for example, is used to modify (e.g., update) an execution state of one or more of the application instances. In at least some implementations, modifying an execution context at one of the application instances can cause the application instance to output and/or continue an application experience from the other application instance. Examples of different application experiences are presented above.

Thus, instances of applications may communicate with one another, such as to enable dynamic contextual awareness between different application instances.

Accordingly, techniques for application interaction platform described herein enable app-app interaction, such as for app-app launching and app-app communication. In at least some implementations, the multiuser application platform reduces resource usage (e.g., processor, memory, and so forth) on computing systems by streamlining interaction processes for interaction between applications.

Having described some example procedures, consider now an example system and device on which the various implementation scenarios and procedures may be implemented.

FIG. 14 illustrates an example system generally at 1400 that includes an example computing device 1402 that is representative of one or more computing systems and/or devices that may implement various techniques described herein. For example, the client device 102 discussed above with reference to FIG. 1 can be embodied as the computing device 1402. The computing device 1402 may be, for example, a server of a service provider, a device associated with the client (e.g., a client device), an on-chip system, and/or any other suitable computing device or computing system.

The example computing device 1402 as illustrated includes a processing system 1404, one or more computer-readable media 1406, and one or more Input/Output (I/O) Interfaces 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1406 is illustrated as including memory/storage 1412. The memory/storage 1412 represents memory/storage capacity associated with one or more computer-readable media. The memory/storage 1412 may include volatile media (such as random access memory (RAM)) and/or nonvolatile media (such as read only memory (ROM), Flash memory, optical disks, magnetic disks, and so forth). The memory/storage 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1410 and computer-readable media 1406 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of modules that are executable by the computing device 1402 as software may be achieved at least partially in hardware, e.g., through use of computer-readable storage media and/or hardware elements 1410 of the processing system. The instructions and/or functions may be executable/operable by one or more articles of manufacture (for example, one or more computing devices 1402 and/or processing systems 1404) to implement techniques, modules, and examples described herein.

As further illustrated in FIG. 14, the example system 1400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1400, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1402 may assume a variety of different configurations, such as for computer 1414, mobile 1416, and television 1418 uses. Each of these configurations includes devices that may have generally different constructs and capabilities, and thus the computing device 1402 may be configured according to one or more of the different device classes. For instance, the computing device 1402 may be implemented as the computer 1414 class of a device that includes a personal computer, desktop computer, a multi-screen computer, laptop computer, netbook, and so on.

The computing device 1402 may also be implemented as the mobile 1416 class of device that includes mobile devices, such as a mobile phone, portable music player, portable gaming device, a tablet computer, a wearable device, a multi-screen computer, and so on. The computing device 1402 may also be implemented as the television 1418 class of device that includes devices having or connected to generally larger screens in casual viewing environments. These devices include televisions, set-top boxes, gaming consoles, and so on.

The techniques described herein may be supported by these various configurations of the computing device 1402 and are not limited to the specific examples of the techniques described herein. For example, functionalities discussed with reference to the client device 102 may be implemented all or in part through use of a distributed system, such as over a "cloud" 1420 via a platform 1422 as described below.

The cloud 1420 includes and/or is representative of a platform 1422 for resources 1424. The platform 1422 abstracts underlying functionality of hardware (e.g., servers) and software resources of the cloud 1420. The resources 1424 may include applications and/or data that can be utilized while computer processing is executed on servers that are remote from the computing device 1402. Resources 1424 can also include services provided over the Internet and/or through a subscriber network, such as a cellular or Wi-Fi network.

The platform 1422 may abstract resources and functions to connect the computing device 1402 with other computing devices. The platform 1422 may also serve to abstract scaling of resources to provide a corresponding level of scale to encountered demand for the resources 1424 that are implemented via the platform 1422. Accordingly, in an interconnected device embodiment, implementation of functionality described herein may be distributed throughout the system 1400. For example, the functionality may be implemented in part on the computing device 1402 as well as via the platform 1422 that abstracts the functionality of the cloud 1420.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A system for launching an instance of a multiuser application, the system comprising: at least one processor; and one or more computer-readable storage media including instructions stored thereon that are executable by the at least one processor to cause the system to: receive a request from an instance of a first multiuser application to launch an instance of a second multiuser application; determine a launch context for launching the instance of the second multiuser application; ascertain whether to launch the instance of the second multiuser application as a multiuser instance or a single user instance based on the launch context; and launch the instance of the second multiuser application as either the multiuser instance or the single user instance in response to ascertaining, based on the launch context, whether to launch the instance of the second multiuser application as the multiuser instance or the single user instance.

In addition to any of the above described systems, any one or combination of: wherein the instructions comprise at least a portion of an operating system; wherein the launch context comprises a user identity associated with the request to launch the instance of the second multiuser application; wherein the launch context comprises a device type for a device on which the instance of the second multiuser application is to be launched; wherein the launch context comprises a user preference setting; wherein the instructions are executable by the at least one processor to cause the system to ascertain whether to launch the instance of the second multiuser application as a multiuser instance or a single user instance by applying the launch context to one or more application policies that specify a first context in which a multiuser application is to launch as a multiuser instance, and a second context in which a multiuser application is to launch as a single user instance; wherein the instance of the first multiuser application is executable on a first device, and wherein the request comprises a request to launch the instance of the second multiuser application on a second device; wherein the instance of the first multiuser application executes based on a default system identity, and wherein the instructions are executable by the one or more processors to cause the system to launch the instance of the second multiuser application as the multiuser instance such that the multiuser instance executes based on the default system identity; wherein the launch context comprises a user identity associated with the request to launch the instance of the second multiuser application, and wherein the instructions are executable by the one or more processors to cause the system to launch the instance of the second multiuser application as the single user instance such that the single user instance executes based on the user identity; wherein the instructions are executable by the one or more processors to cause the system to send a communication from the instance of the first multiuser application to the instance of the second multiuser application effective to cause the instance of the second multiuser application to modify its execution based on information included in the communication.

A method for launching an instance of a multiuser application, the method comprising: receiving a request from an instance of an application on a first device to launch an instance of a multiuser application on a second device; ascertaining whether to launch the instance of the multiuser application on the second device as a multiuser instance or a single user instance based on a launch context for launching the instance of the multiuser application; and launching the multiuser application on the second device as either the multiuser instance or the single user instance in response to ascertaining, based on the launch context, whether to launch the multiuser application as the multiuser instance or the single user instance.

In addition to any of the above described methods, any one or combination of: wherein the launch context is received at the second device from the first device; wherein the launch context is determined locally at the second device; wherein the launch context comprises one or more of a device type of the second device, a user identity for a user of one or more of the first device or the second device, or a user preference setting; further comprising receiving execution context information from the first device, and executing the instance of the multiuser application on the second device and based on the execution context information; wherein the launch context comprises a user identity associated with the request to launch the instance of the multiuser application, and wherein the method further comprises: launching the instance of the multiuser application on the second device as the single user instance; and executing the single user instance on the second device according to the user identity; wherein the launch context comprises a user identity associated with the second device, said launching comprises launching the multiuser application as the multiuser instance on the second device, and wherein the method further comprises executing the multiuser instance on the second device according to a default system identity associated with the second device.

A computer system for enabling communication between different applications, the computer system comprising: at least one processor; and one or more computer-readable storage media including instructions stored thereon that, responsive to execution by the at least one processor, cause the computer system to implement: an operating system configured to enable an instance of a first application to initiate launch of an instance of a second application, one or more of the first application or the second application representing a multiuser application; and an application programming interface (API) configured to enable communication between the instance of the first application and the instance of the second application and via the operating system, the communication including exchanging execution context information between the instance of the first application and the instance of the second application to cause one or more of the instance of the first application or the instance of the second application to modify an execution context.

In addition to any of the above described computer systems, any one or combination of: wherein the second application comprises a multiuser application, and wherein the operating system is further configured to launch the second application as one of a multiuser instance or a single user instance based on a launch context; wherein the execution context information comprises content generated at the instance of the first application, and wherein the communication causes the instance of the second application to present the content as part of its execution context.

What is claimed is:

1. A system comprising:
   at least one processor; and
   one or more computer-readable storage media including instructions stored thereon that are executable by the at least one processor to cause the system to:
      receive from a first multiuser operating system on a first device, by a second multiuser operating system on a second device, a request on behalf of an instance of a first multiuser application on the first device to launch an instance of a second multiuser application on the second device, each of the first multiuser operating system and the second multiuser operating system permitting multiple users to be concurrently authenticated therewith, the request being generated by the first multiuser operating system in response to receiving a launch event from the instance of the first multiuser application via an application programming interface on the first device;
      determine, by the second multiuser operating system, a launch context for launching the instance of the second multiuser application, the launch context comprising at least one of a device type or a hardware-based device resource for the second device on which the instance of the second multiuser application is to be launched;
      ascertain, by the second multiuser operating system, whether to launch the instance of the second multiuser application as a multiuser instance or a single user instance based on the launch context; and
      launch, by the second multiuser operating system, the instance of the second multiuser application as either the multiuser instance or the single user instance in response to ascertaining, based on the launch context, whether to launch the instance of the second multiuser application as the multiuser instance or the single user instance.

2. The system as recited in claim 1, wherein the instructions comprise at least a portion of the second multiuser operating system.

3. The system as recited in claim 1, wherein the launch context further comprises a user identity associated with the request to launch the instance of the second multiuser application.

4. The system as recited in claim 1, wherein the launch context further comprises a user preference setting.

5. The system as recited in claim 1, wherein the instructions are executable by the at least one processor to cause the system to ascertain whether to launch the instance of the second multiuser application as a multiuser instance or a single user instance by applying the launch context to one or more application policies that specify a first context in which a multiuser application is to launch as a multiuser instance, and a second context in which a multiuser application is to launch as a single user instance.

6. The system as recited in claim 1, wherein the instance of the first multiuser application executes based on a default system identity, and wherein the instructions are executable by the one or more processors to cause the system to launch the instance of the second multiuser application as the multiuser instance such that the multiuser instance executes based on the default system identity.

7. The system as recited in claim 1, wherein the launch context further comprises a user identity associated with the request to launch the instance of the second multiuser application, and wherein the instructions are executable by the one or more processors to cause the system to launch the instance of the second multiuser application as the single user instance such that the single user instance executes based on the user identity.

8. The system as recited in claim 1, wherein the instructions are executable by the one or more processors to cause the system to receive a communication from the instance of the first multiuser application to the instance of the second multiuser application effective to cause the instance of the second multiuser application to modify its execution based on information included in the communication.

9. A method comprising:
   receiving, from a first multiuser operating system on a first device, by a second multiuser operating system on a second device, a request on behalf of an instance of an application on the first device to launch an instance of a multiuser application on the second device, each of the first multiuser operating system and the second multiuser operating system permitting multiple users to be concurrently authenticated therewith, the request being generated by the first multiuser operating system in response to receiving a launch event from the instance of the application via an application programming interface on the first device;
   ascertaining, by the second multiuser operating system, whether to launch the instance of the multiuser application on the second device as a multiuser instance or a single user instance based on a launch context for launching the instance of the multiuser application, the launch context comprising at least one of a device type or a hardware-based device resource for the second device on which the instance of the multiuser application is to be launched; and
   launching, by the second multiuser operating system, the multiuser application on the second device as either the multiuser instance or the single user instance in response to ascertaining, based on the launch context, whether to launch the multiuser application as the multiuser instance or the single user instance.

10. The method as recited in claim 9, wherein the launch context is received at the second device from the first device.

11. The method as recited in claim 9, wherein the launch context is determined locally at the second device.

12. The method as recited in claim 9, wherein the launch context further comprises one or more of a user identity for a user of one or more of the first device or the second device or a user preference setting.

13. The method as recited in claim 9, further comprising receiving execution context information from the first device, and executing the instance of the multiuser application on the second device and based on the execution context information.

14. The method as recited in claim 9, wherein the launch context further comprises a user identity associated with the request to launch the instance of the multiuser application, and wherein the method further comprises:
launching the instance of the multiuser application on the second device as the single user instance; and
executing the single user instance on the second device according to the user identity.

15. The method as recited in claim 9, wherein the launch context further comprises a user identity associated with the second device, said launching comprises launching the multiuser application as the multiuser instance on the second device, and wherein the method further comprises executing the multiuser instance on the second device according to a default system identity associated with the second device.

16. A computer system comprising:
at least one processor; and
one or more computer-readable storage media including instructions stored thereon that, responsive to execution by the at least one processor, cause the computer system to implement:
a first multiuser operating system on a first device configured to:
receive, from a second multiuser operating system on a second device, a request on behalf of an instance of a first application on the second device to initiate launch of an instance of a second application on the first device, based on a launch context for launching the instance of the second application, the launch context comprising at least one of a device type or a hardware-based device resource for the first device on which the instance of the second application is to be launched, one or more of the first application or the second application representing a multiuser application, each of the first multiuser operating system and the second multiuser operating system permitting multiple users to be concurrently authenticated therewith, the request being generated by the second multiuser operating system in response to receiving a launch event from the instance of the first application via an application programming interface on the second device;
ascertain whether to launch the instance of the second application as a multiuser instance or a single user instance based on the launch context; and
launch the instance of the second application as either the multiuser instance or the single user instance in response to ascertaining whether to launch the instance of the second application as a multiuser instance or a single user instance based on the launch context.

17. The computer system as recited in claim 16, wherein the instance of the first application provides execution context information to the instance of the second application, the execution context information comprising content generated at the instance of the first application.

18. The computer system as recited in claim 16, wherein the launch context further comprises a user identity for a user of one or more of the first device or the second device.

19. The computer system as recited in claim 16, wherein the launch context further comprises a user preference setting.

20. The computer system as recited in claim 16, wherein the launch context further comprises a user identity associated with the first device, wherein the first multiuser operating system is configured to launch the instance of the second application as the multiuser instance on the first device, and wherein the first multiuser operating system is further configured to execute the multiuser instance on the first device according to a default system identity associated with the first device.

* * * * *